(12) United States Patent
Cafasso

(10) Patent No.: US 11,623,338 B2
(45) Date of Patent: Apr. 11, 2023

(54) UNIVERSAL HANDLE, GROOMING OR HAIR COLLECTION TOOLS, AND METHODS OF USE

(71) Applicant: Spectrum Brands, Inc., Middleton, WI (US)

(72) Inventor: Daniel Cafasso, Cincinnati, OH (US)

(73) Assignee: Spectrum Brands, Inc., Middleton, WI (US)

( * ) Notice: Subject to any disclaimer, the term of this patent is extended or adjusted under 35 U.S.C. 154(b) by 453 days.

(21) Appl. No.: 16/817,882

(22) Filed: Mar. 13, 2020

(65) Prior Publication Data
US 2020/0215682 A1 Jul. 9, 2020

Related U.S. Application Data

(62) Division of application No. 15/258,019, filed on Sep. 7, 2016, now Pat. No. 10,589,415.

(60) Provisional application No. 62/217,488, filed on Sep. 11, 2015.

(51) Int. Cl.
| | |
|---|---|
| *B25G 3/26* | (2006.01) |
| *A01K 13/00* | (2006.01) |
| *B25G 1/10* | (2006.01) |
| *A47L 25/00* | (2006.01) |
| *A47L 7/00* | (2006.01) |
| *B25G 3/12* | (2006.01) |

(52) U.S. Cl.
CPC .............. *B25G 3/26* (2013.01); *A01K 13/002* (2013.01); *A47L 7/0066* (2013.01); *A47L 25/005* (2013.01); *B25G 1/102* (2013.01); *B25G 3/12* (2013.01); *Y10T 403/599* (2015.01)

(58) Field of Classification Search
CPC ... A01K 13/002; A47L 25/005; A47L 7/0066; B25G 1/102; B25G 3/12; B25G 3/26; Y10T 403/599
See application file for complete search history.

(56) References Cited

U.S. PATENT DOCUMENTS

| | | | | |
|---|---|---|---|---|
| 2,682,414 | A | * | 6/1954 | Richardson ......... B25B 23/0042 403/325 |
| 3,004,362 | A | | 10/1961 | Day |
| 4,162,132 | A | | 7/1979 | Hepperle et al. |

(Continued)

FOREIGN PATENT DOCUMENTS

| | | |
|---|---|---|
| CN | 2283358 Y | 6/1998 |
| CN | 201467804 U * | 5/2010 |

(Continued)

OTHER PUBLICATIONS

Office Action for Chinese Application No. 201680060179.7 dated Jul. 27, 2020, 15 pages.

(Continued)

*Primary Examiner* — Marc Carlson
(74) *Attorney, Agent, or Firm* — Merchant & Gould P.C.

(57) ABSTRACT

A system includes a universal handle and a variety of tools selectively secured within the handle. The tools can be tools for grooming or collecting hair, and are especially useful with animals such as household pets. One example tool includes a mat breaker that is adjustable for left handed or right handed use. Another example tool is a fur sweeper tool and a fur accumulator tool. Other tools include deshedders, brushes, and combs.

16 Claims, 23 Drawing Sheets

(56) References Cited

U.S. PATENT DOCUMENTS

| | | | |
|---|---|---|---|
| 4,406,559 A | 9/1983 | Geertsema et al. | |
| 4,729,147 A * | 3/1988 | Armbruster | A47L 5/36 |
| | | | 15/352 |
| 5,625,923 A | 5/1997 | Huang | |
| 5,774,994 A | 7/1998 | Stein et al. | |
| 6,367,422 B1 | 4/2002 | Wilhelmi | |
| 6,502,585 B1 * | 1/2003 | Mazzei | A46B 7/04 |
| | | | 15/176.1 |
| 7,234,188 B1 | 6/2007 | McKay | |
| 8,132,541 B1 * | 3/2012 | Baer, Jr. | A46B 9/023 |
| | | | 119/664 |
| 8,215,319 B2 * | 7/2012 | Couillard | A45D 20/525 |
| | | | 132/238 |
| 8,408,161 B2 * | 4/2013 | Lin | A46B 5/0095 |
| | | | 15/176.1 |
| 8,469,425 B1 * | 6/2013 | Lofley, Sr. | B25G 3/26 |
| | | | 294/175 |
| 8,919,353 B2 * | 12/2014 | Richardson | A45D 20/525 |
| | | | 132/237 |
| 9,237,788 B2 * | 1/2016 | Scumaci | A45D 2/145 |
| 9,814,214 B1 * | 11/2017 | Murphy | A01K 13/002 |
| 10,028,574 B2 * | 7/2018 | Rennette | A45D 20/52 |
| 10,292,486 B2 * | 5/2019 | Vecchiola | A45D 20/52 |
| 2001/0047570 A1 | 12/2001 | Lanz | |
| 2004/0052570 A1 | 3/2004 | McKay | |
| 2005/0066457 A1 | 3/2005 | McKay | |
| 2005/0081875 A1 * | 4/2005 | Wang | A46B 9/023 |
| | | | 132/219 |
| 2006/0032458 A1 * | 2/2006 | Hutchinson | A01K 13/003 |
| | | | 119/603 |
| 2007/0017072 A1 * | 1/2007 | Serio | F16B 7/042 |
| | | | 24/573.11 |
| 2007/0169720 A1 * | 7/2007 | Roy | A46B 7/10 |
| | | | 119/615 |
| 2008/0115735 A1 * | 5/2008 | Wang | A01K 13/002 |
| | | | 30/30 |
| 2008/0313858 A1 | 12/2008 | Blom | |
| 2009/0229624 A1 * | 9/2009 | Purvis | A45D 20/525 |
| | | | 186/59 |
| 2009/0272332 A1 * | 11/2009 | Lin | A01K 13/002 |
| | | | 119/633 |
| 2010/0263219 A1 * | 10/2010 | Kempker | B26B 25/005 |
| | | | 83/13 |
| 2011/0079116 A1 * | 4/2011 | Hu | B25B 23/0042 |
| | | | 81/439 |
| 2011/0180013 A1 * | 7/2011 | Kissel, Jr. | A46B 13/02 |
| | | | 119/609 |
| 2011/0297101 A1 * | 12/2011 | Fernandez | A01K 13/002 |
| | | | 119/603 |
| 2012/0036660 A1 | 2/2012 | Ross | |
| 2014/0059792 A1 * | 3/2014 | Naccour | B25G 3/04 |
| | | | 15/160 |
| 2015/0047575 A1 * | 2/2015 | Jui-Tsang | A01K 13/002 |
| | | | 119/628 |
| 2017/0071156 A1 * | 3/2017 | Cafasso | B25G 3/12 |
| 2020/0215682 A1 * | 7/2020 | Cafasso | B25G 3/12 |

FOREIGN PATENT DOCUMENTS

| | | |
|---|---|---|
| CN | 201467804 U | 5/2010 |
| CN | 203035681 U | 7/2013 |
| CN | 104358757 A | 2/2015 |
| EP | 2823730 A2 | 1/2015 |
| WO | WO-02091818 A2 * | 11/2002 ............. A01K 13/00 |

OTHER PUBLICATIONS

Second Office Action for Chinese Application No. 201680060179.7 dated Feb. 3, 2021, 21 pages.
Partial International Search Report for Application No. PCT/US2106/050487 dated Nov. 22, 2016.
International Search Report and Written Opinion for Application No. PCT/US2016/050487 dated Mar. 1, 2017.

* cited by examiner

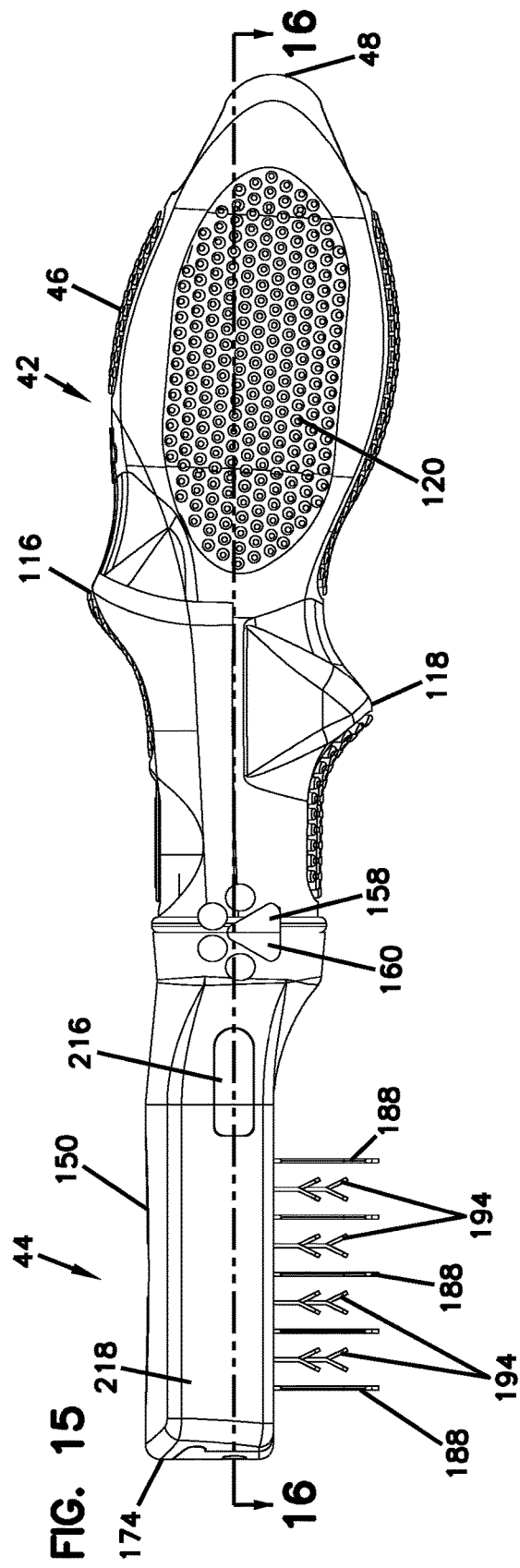
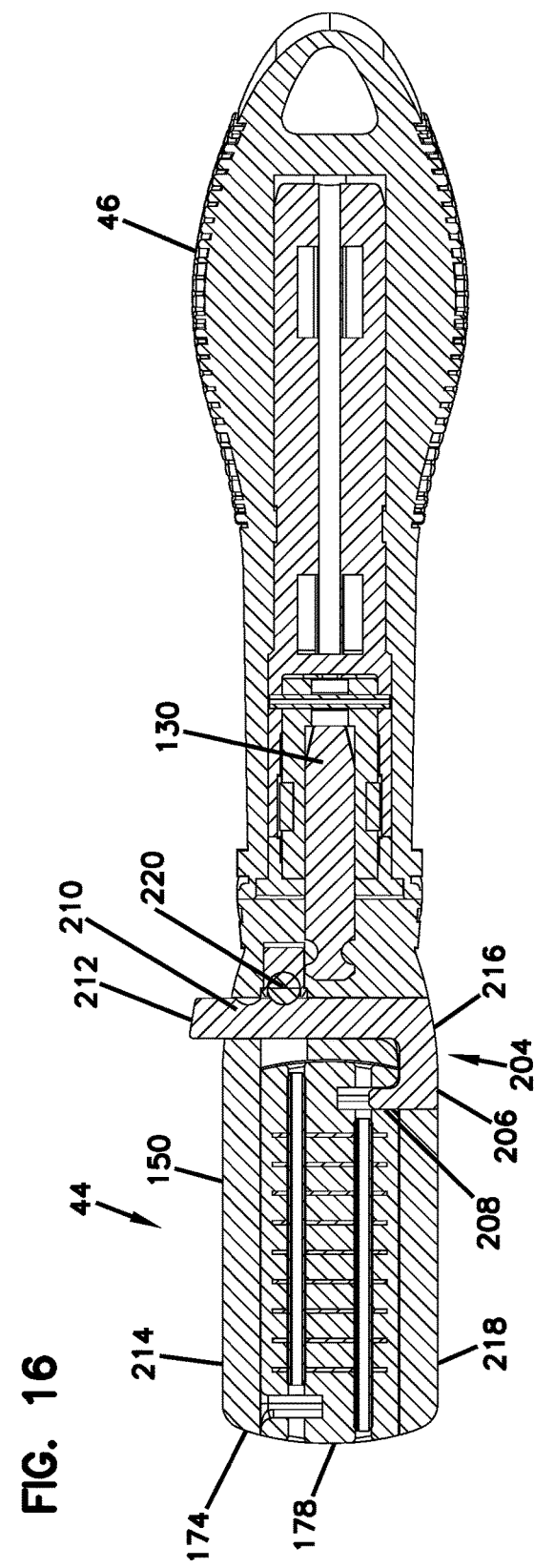

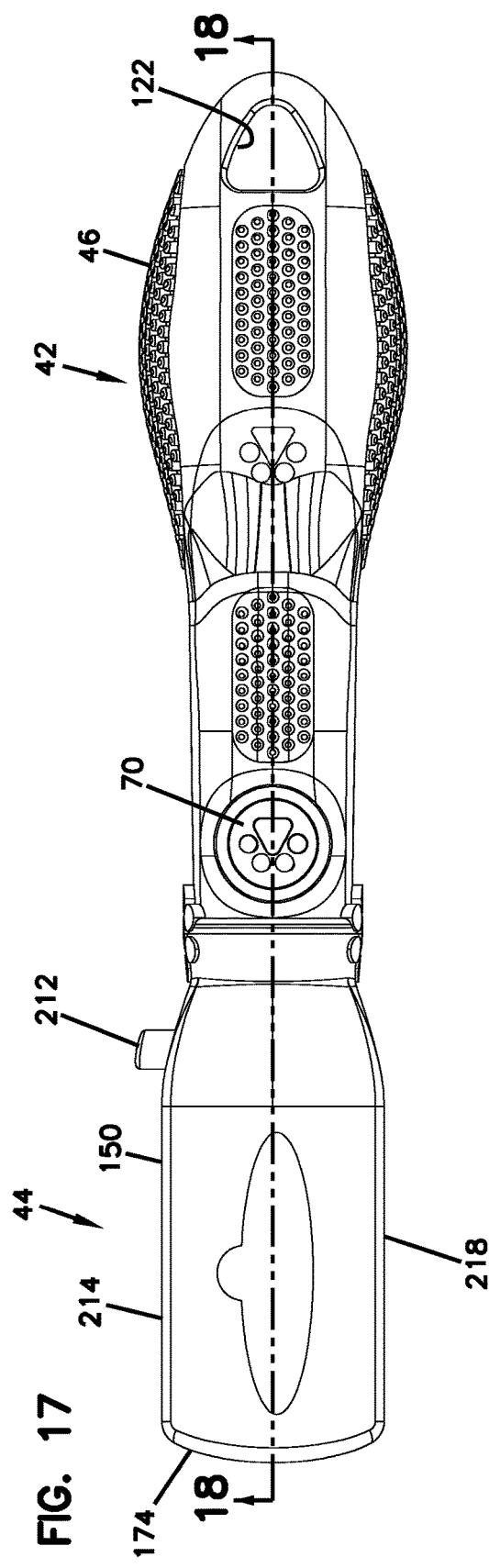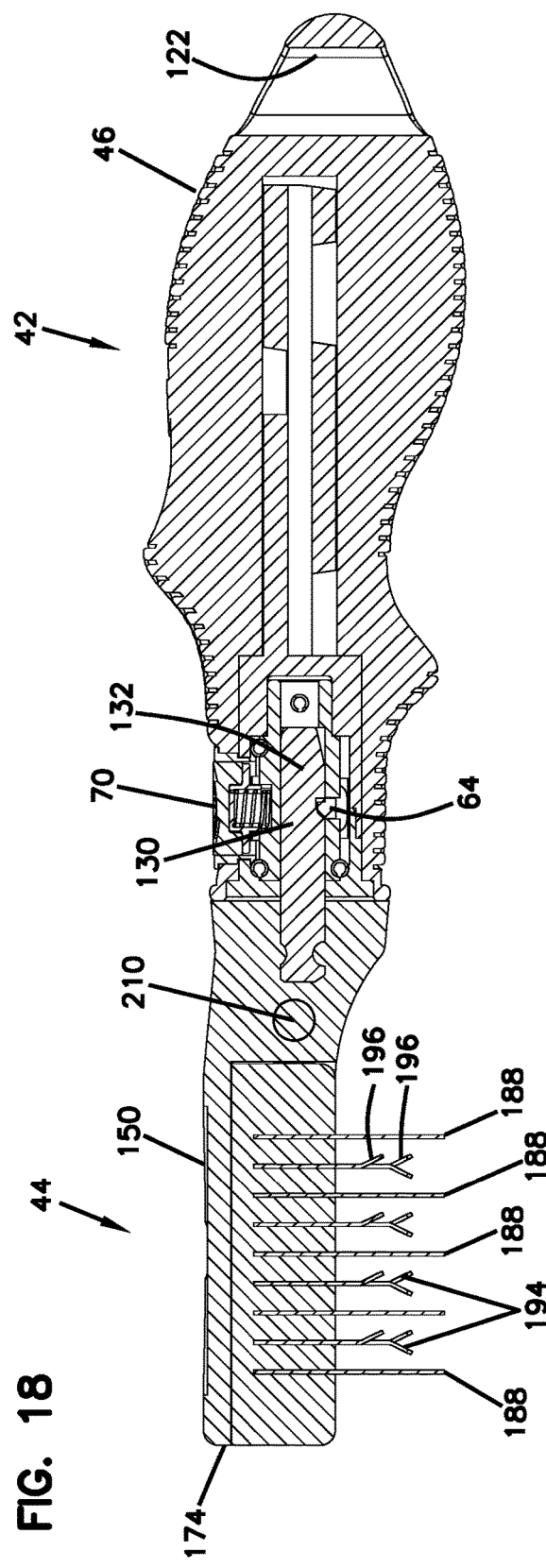

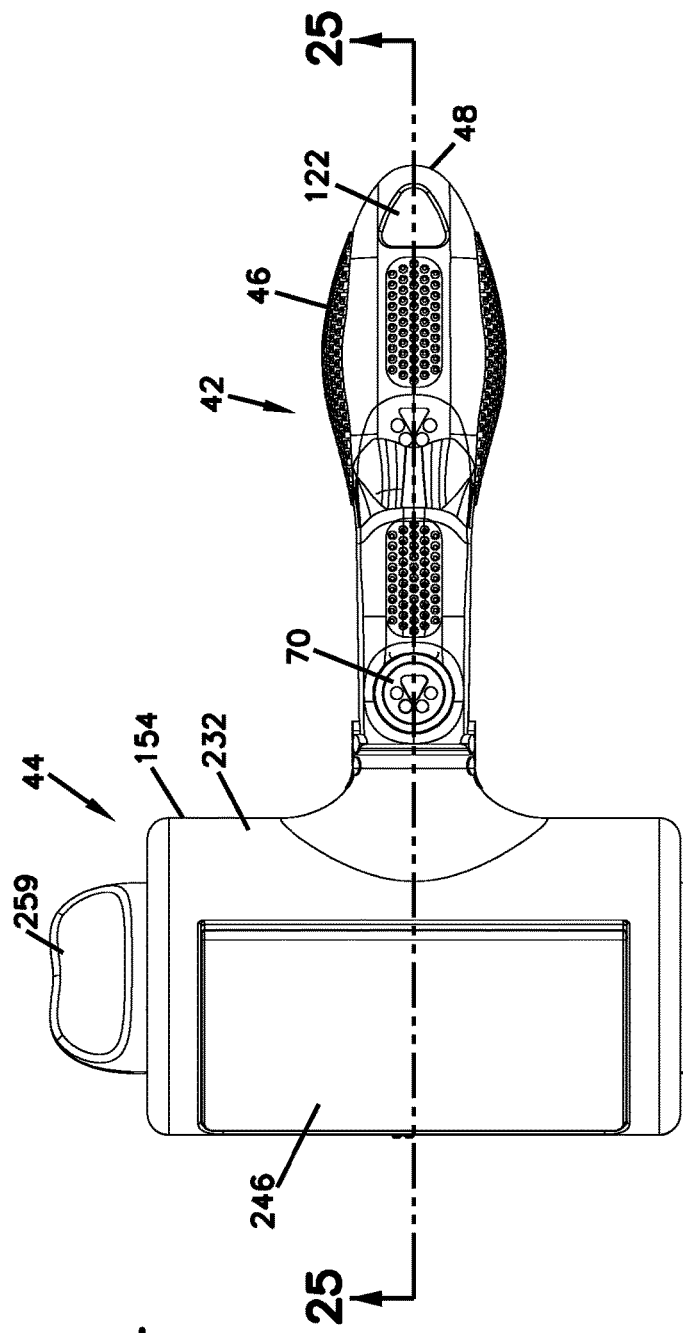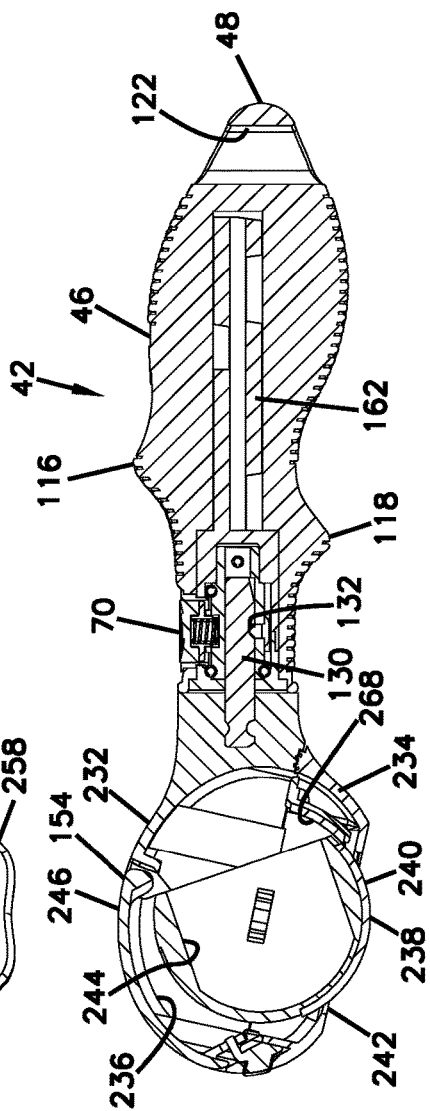

UNIVERSAL HANDLE, GROOMING OR HAIR COLLECTION TOOLS, AND METHODS OF USE

CROSS-REFERENCE TO RELATED APPLICATION

This application is a divisional of U.S. patent application Ser. No. 15/258,019 filed Sep. 7, 2016 which claims the benefit of U.S. Patent Application Ser. No. 62/217,488, filed Sep. 11, 2015, which is incorporated herein by reference in its entirety.

TECHNICAL FIELD

This disclosure concerns a handle that can be used with multiple tool heads, including tool heads for grooming or hair collection for use with animals. This disclosure also concerns some tools for use in the system, including a mat breaker, fur sweeper, and fur accumulator tool.

BACKGROUND

Some households include multiple animals as pets. Some animals have short hair, such as short haired cats, while some have medium or long hair or shaggy coats, found in a variety of dogs. For animals with fur coats, it is helpful to groom the animal to help keep the coat healthy and to prevent shedding of fur throughout the house. One problem in the past has been multiple animals require multiple different grooming tools. For example, a grooming tool that would be appropriate for a short haired cat would not be useful on a shaggy dog. Thus, in the past, it has been necessary to purchase multiple different grooming tools that were appropriate for the multiple different animals. In addition, in households that have only a single animal as a pet, it is still helpful to have multiple tools to groom the animal to address different grooming needs of the single animal. For example, the single animal may include a tool for deshedding, a tool for detangling, and a tool for smoothing and combing.

The present disclosure offers a solution to the problem of having to acquire multiple tools to address the needs of either a single pet or multiple pets. The present disclosure includes a universal handle and multiple grooming or hair collection tools releasably securable to the universal handle.

One of the problems in the past has been tools that are made for a particular right or left hand orientation. For example, certain tools, such as a mat breaker for removing mats in fur, can use curved blades that are oriented for either right or left hand users. It would be helpful to have a mat breaker that is useful for either a left handed or right handed user. The present disclosure offers a solution to that problem.

Another problem encountered when grooming animals is cleanup of the hair. For example, animal hair or fur can be shedded on carpeting, couches, or a person's clothing. Improvement in tools for hair cleanup are desirable.

SUMMARY

A handle for receiving a plurality of tools is provided. The handle includes a grip sized to be grasped by a human hand, the grip including a tool-receiving bore defined therein and a lock mechanism to secure a tool within the bore and to selectively release the tool from the bore.

The grip has a free end and an opposite tool-receiving end, with the bore being through the tool-receiving end.

The lock mechanism includes a pin extending into an interior volume of the bore.

The pin can be spring-biased radially inwardly into the interior volume of the bore.

The grip may further include a push button to move the pin at least partially out of the interior volume of the bore.

The push button may move the pin against the spring to move the pin.

In one or more embodiments, the push button is immediately adjacent to the tool-receiving end.

The handle can further include a ramped thumb-rest spaced between the free end and push button, with the thumb-rest being on a same side of the grip as the push button.

In one or more embodiments, the handle can include a ramped index finger-rest spaced between the free end and the push button, the index finger-rest being on an opposite side of the grip as the push button.

In some embodiments, the index finger-rest is located between the push button and the thumb rest.

In one or more embodiments, a multiple finger-rest is between the free end and the index finger rest and is located on a lateral side of the grip between the side of the index finger rest and the side of the thumb rest.

The multiple finger-rest may be between the thumb rest and the free end.

The grip may further include a mounting hole adjacent to the free end.

The grip can include molded polymer material to enhance friction between the grip and a human hand.

In many embodiments, the bore is shaped to index a tool secured thereto in a specific direction.

A cross-sectional opening of the bore can be in the shape of a truncated circle. The interior wall of the bore can have a cross-sectional shape of the truncated circle.

In another aspect, a system for grooming an animal can use a handle as variously characterized above and a grooming or hair collection tool releasably secured within the bore.

The tool includes a post sized to fit within the bore.

The post can include a detent sized and shaped to receive the pin of the lock mechanism.

The post can be at least 0.5 inches in length.

The post can be no greater than 1 inch in length. The post can have a free end and an opposite tool end, with the detent being spaced less than 0.5 inches from the free end.

The detent can be spaced more than 0.25 inches from the free end.

The post can be shaped to be received within the bore for engagement with the pin in only a single orientation.

In one or more embodiments, one side of the post will have a flat surface.

The side of the post having the detent can be opposite of the side of the post having a flat surface.

In one or more embodiments, the post has a greatest cross-sectional dimension of greater than ⅛ inch.

In one or more embodiments, the post has a greatest cross-sectional dimension of less than 0.25 inch.

The grooming or hair collection tool may include any one of a de-shedding tool, a brush, mat breaker, a fur sweeper tool, a fur accumulator tool, a comb, and other tools for managing fur.

In another aspect, a method of using a system for grooming includes providing a handle; selecting a grooming or hair collection tool; and releasably securing the selected tool to the handle.

The step of providing a handle can include providing a handle as variously characterized above.

The step of selecting a grooming or hair collection tool includes selecting a tool having a post with a detent.

The step of releasably securing the selected tool includes inserting the post into the bore and engaging the pin and detent.

The step of inserting the post into the bore includes inserting the post that is shaped to be received within the bore for engagement with the pin in only a single orientation.

After the step of releasably securing the selective tool to the handle, there can be a step of releasing the selected tool from the handle by pressing the push button.

After the step of releasably securing the selected tool to the handle, there can be the step of releasing the selected tool from the handle by pressing the push button to move the pin from the detent in the post.

The step of releasably securing the selected tool can include making an audible click sound as the tool and handle engage.

The step of selecting a grooming or hair collection tool can include selecting from the group comprising a de-shedding tool, a brush, a mat breaker, a fur sweeper tool, a fur accumulator tool, and a comb.

The step of selecting a grooming or hair collection tool may include selecting from the group consisting of a de-shedding tool, a brush, a mat breaker, a fur sweeper tool, a fur accumulator tool, and a comb.

The step of securing the selected tool can include orienting a first distinct visual mark on the handle, with a second distinct visual mark on the tool.

The step of orienting a first distinct visual mark on the handle with a second distinct visual mark on the tool can include forming a resulting third distinct visual mark from the first and second visual marks.

In another aspect, a mat breaker for grooming animals is provided. The mat breaker includes a base member; a handle-engaging post extending from the base member; and a set of curved teeth held within the base member, the set of teeth being movable within the base member.

The set of teeth can be rotatable 180° within the base member.

The set of teeth can be held by a substrate that is removably oriented in the base member.

The mat breaker can further include a lock mechanism to releasably secure the substrate in operable orientation in the base member.

The lock member can include pushable finger, and the substrate can include a detent sized to receive the finger.

The base can have an open substrate-receiving cavity sized and shaped to releasably hold the substrate.

The base may include an end having the handle-engaging post and an opposite free end, the free end having an opening in communication with the cavity.

In one or more embodiments, the base has slide grooves along the sides of the cavity, and substrate includes rails on opposite sides of the substrate to slide within the grooves.

In one or more embodiments, the set of curved teeth includes each tooth having an inside edge comprising a cutting blade and curving at an angle between 80-100°.

The mat breaker can further include hair separator blades between adjacent ones of the curved teeth.

The post can include a detent.

The post can include a detent sized and shaped to receive the pin of the lock mechanism.

The post can be at least 0.5 inches in length.

The post can be no greater than 1 inch in length.

The post can have a free end and an opposite tool end, with the detent being spaced less than 0.5 inches from the free end.

The detent can be spaced more than 0.25 inches from the free end.

The post can be shaped to be received within the bore for engagement with the pin in only a single orientation.

In one or more embodiments, one side of the post will have a flat surface.

The side of the post having the detent can be opposite of the side of the post having a flat surface.

In one or more embodiments, the post has a greatest cross-sectional dimension of greater than ⅛ inch.

In one or more embodiments, the post has a greatest cross-sectional dimension of less than 0.25 inch.

In another aspect, method of using a mat breaker can include the mat breaker as variously characterized above, and removing the set of curved teeth from the base, rotating the set of curved teeth 180°, and operably securing the set of curved teeth in the base.

The step of removing can include pushing the push button to move the finger from engagement with the detent in the substrate.

The step of operably securing the set of curved teeth in the base includes sliding the substrate into a cavity in the base and pushing a tab to move the finger into engagement with the detent in the substrate.

The mat breaker can be releasably secured to the handle as variously characterized above.

In another aspect, a fur sweeper tool is provided. The fur sweeper tool includes a base holder; a handle-engaging post extending from the base holder; and a roller held by the base holder having fur attracting material.

The base holder includes an open tube, and the roller is rotatably held within the open tube.

The base holder has an opening providing exposure to the fur attracting material of the roller.

The roller defines a chamber to collect fur.

The chamber can be accessible through a movable door secured to the base holder.

The door may be transparent.

The door may be selectively lockable and unlockable to the base holder.

The roller can include first and second twist knobs at opposite ends of the roller and extending outside of the base holder, the twist knobs allowing rotation of the roller within the base holder.

The roller can be rotatable between 70° and 180°.

The fur attracting material can include a non-adhesive fabric.

The post can include a detent.

The post can include a detent sized and shaped to receive the pin of the lock mechanism.

The post can be at least 0.5 inches in length.

The post can be no greater than 1 inch in length.

The post can have a free end and an opposite tool end, with the detent being spaced less than 0.5 inches from the free end.

The detent can be spaced more than 0.25 inches from the free end.

The post can be shaped to be received within the bore for engagement with the pin in only a single orientation.

In one or more embodiments, one side of the post will have a flat surface.

The side of the post having the detent can be opposite of the side of the post having a flat surface.

In one or more embodiments, the post has a greatest cross-sectional dimension of greater than ⅛ inch.

In one or more embodiments, the post has a greatest cross-sectional dimension of less than 0.25 inch.

A method of using a first sweeper tool can include using the tool as variously characterized herein and rubbing the fur attracting material of the roller over a surface to pick up hair from the surface.

The method can include rotating the roller by rotating one or more of the twist knobs to at least partially clean the hair from the fur attracting material of the roller.

The method may further include, after rotating the roller, viewing the chamber through the door.

The method may further include unlocking the door to access the chamber, removing the hair from the chamber, and then locking the door to secure the door to the base holder.

The method may further include, after removing hair from the chamber, rotating the roller to put the fur attracting material into an opening of the base holder.

The fur sweeper tool can be releasably secured to the handle as variously characterized herein.

In another aspect, a fur accumulator tool is provided. The tool includes a base member; a handle-engaging post extending from the base member; and a plurality of nubs extending from the base member to pick up hair when the tool is moved against a hairy surface.

The base member has a plate section and a handle engaging section projecting over the plate section, the nubs extending from the plate section.

The plate section can be between the handle engaging section and the nubs.

The nubs can be held by a substrate secured to the plate section.

The nubs may have a height of less than ⅜ inch.

The nubs may have a height of greater than ⅛ inch.

There can be at least 150 nubs.

There can be fewer than 300 nubs.

The nubs may be arranged in straight rows and columns.

There may be about 20-30 nubs per square inch.

The plate section can have a width of at least 3 inches and a length of at least 4 inches.

The plate section can have a width of not greater than 6 inches and a length of not greater than 8 inches.

The post can include a detent.

The post can include a detent sized and shaped to receive the pin of the lock mechanism.

The post can be at least 0.5 inches in length.

The post can be no greater than 1 inch in length.

The post can have a free end and an opposite tool end, with the detent being spaced less than 0.5 inches from the free end.

The detent can be spaced more than 0.25 inches from the free end.

The post can be shaped to be received within the bore for engagement with the pin in only a single orientation.

In one or more embodiments, one side of the post will have a flat surface.

The side of the post having the detent can be opposite of the side of the post having a flat surface.

In one or more embodiments, the post has a greatest cross-sectional dimension of greater than ⅛ inch.

In one or more embodiments, the post has a greatest cross-sectional dimension of less than 0.25 inch.

A method of using a fur accumulator tool can include using the fur accumulator tool as variously characterized above, and moving the nubs against and over a hairy surface to pick up hair by the nubs from the surface.

The fur accumulator tool can be releasably secured to the handle as variously characterized above.

A variety of examples of desirable product features or methods are set forth in part in the description that follows, and in part, will be apparent from the description, or maybe learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 15 is a side view of the mat breaker and handle of FIG. 13;

FIG. 16 is a cross sectional view of the mat breaker and handle, the cross section being taken along the line 16-16 of FIG. 15;

FIG. 17 is a top plan view of the mat breaker and handle of FIG. 11;

FIG. 18 is a cross sectional view of the mat breaker and handle, the cross section being taken along the line B-B of FIG. 17;

FIG. 24 is a top plan view of the fur sweeper tool and handle of FIG. 20;

FIG. 25 is a cross sectional view of the fur sweeper tool and handle, the cross section being taken along the line 25-25 of FIG. 24;

DETAILED DESCRIPTION

Figure 1:
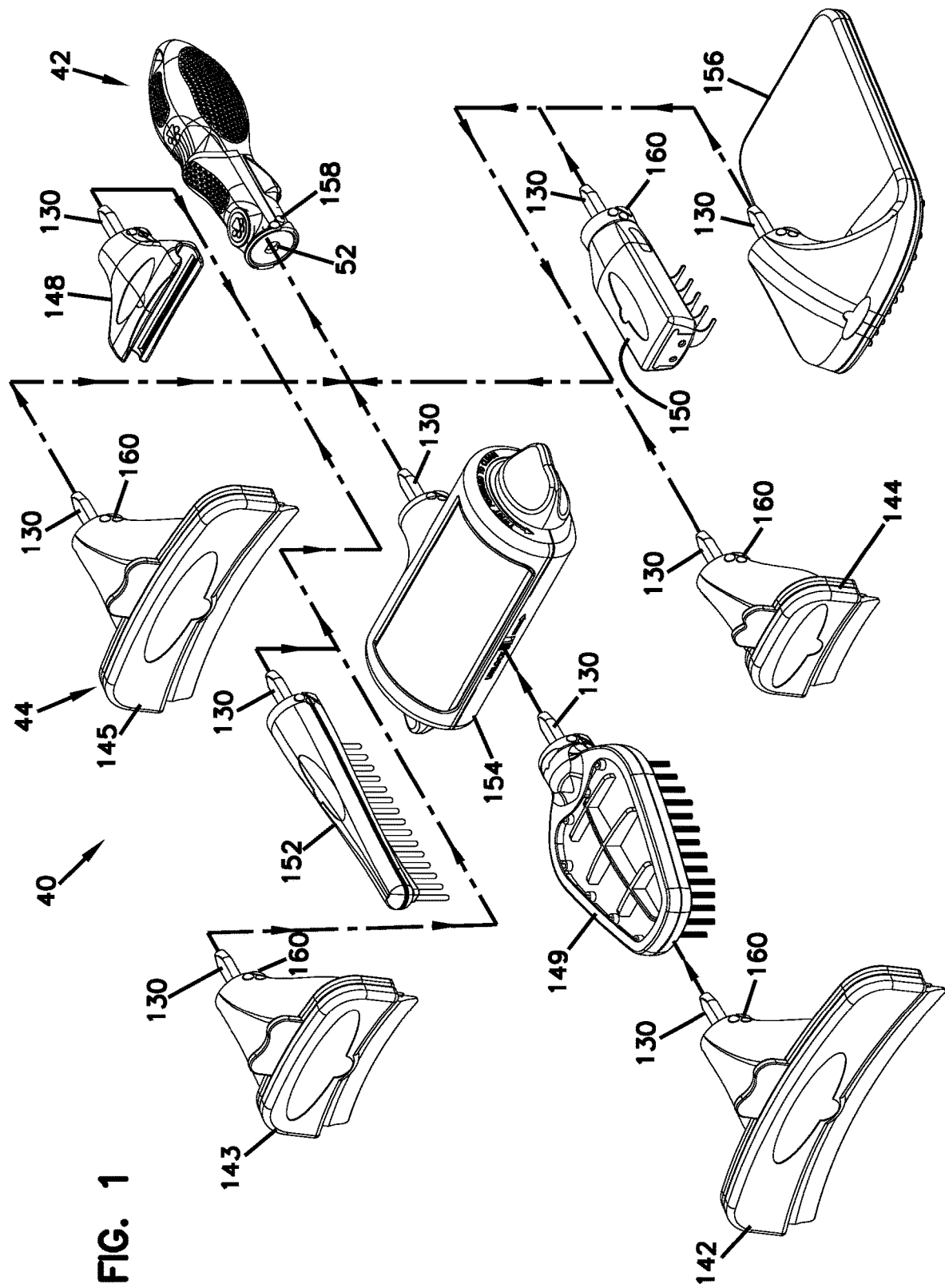
FIG. 1 is an exploded, perspective view of a system for grooming an animal including a handle and a plurality of tools, constructed in accordance with principles of this disclosure.

FIG. 1 depicts a system 40. The system 40 is preferably used for grooming an animal, such as a household pet. The system 40 is particularly helpful for use by consumers in multi-pet households, in which the plurality of pets benefit from the use of different tools depending upon the fur length and coarseness of the coat of the pet and the grooming needs of the pet.

The system 40 includes a single universal handle 42. The handle 42 is releasably connectable to a plurality of grooming or hair collection tools 44. The tools 44 can include grooming tools, which include, for example, any tools that will touch or treat the fur or hair of the animal or in any other way be used on the animal. For example, grooming tools may include any various combs, brushes, sheers, shavers, scissors, nail trimmers, detanglers, and the like. Hair collection tools can be any type of tool that is used for cleanup and can be used on surfaces that hair or fur is on. For example, hair collection tools can include fur sweepers, fur accumulators, adhesive rollers, vacuum systems, and the like. Examples of particularly useful tools are discussed herein. However, it should be understood that any tool with the appropriate connection system can be used with the handle 42.

A. Example Handle

Figure 2:
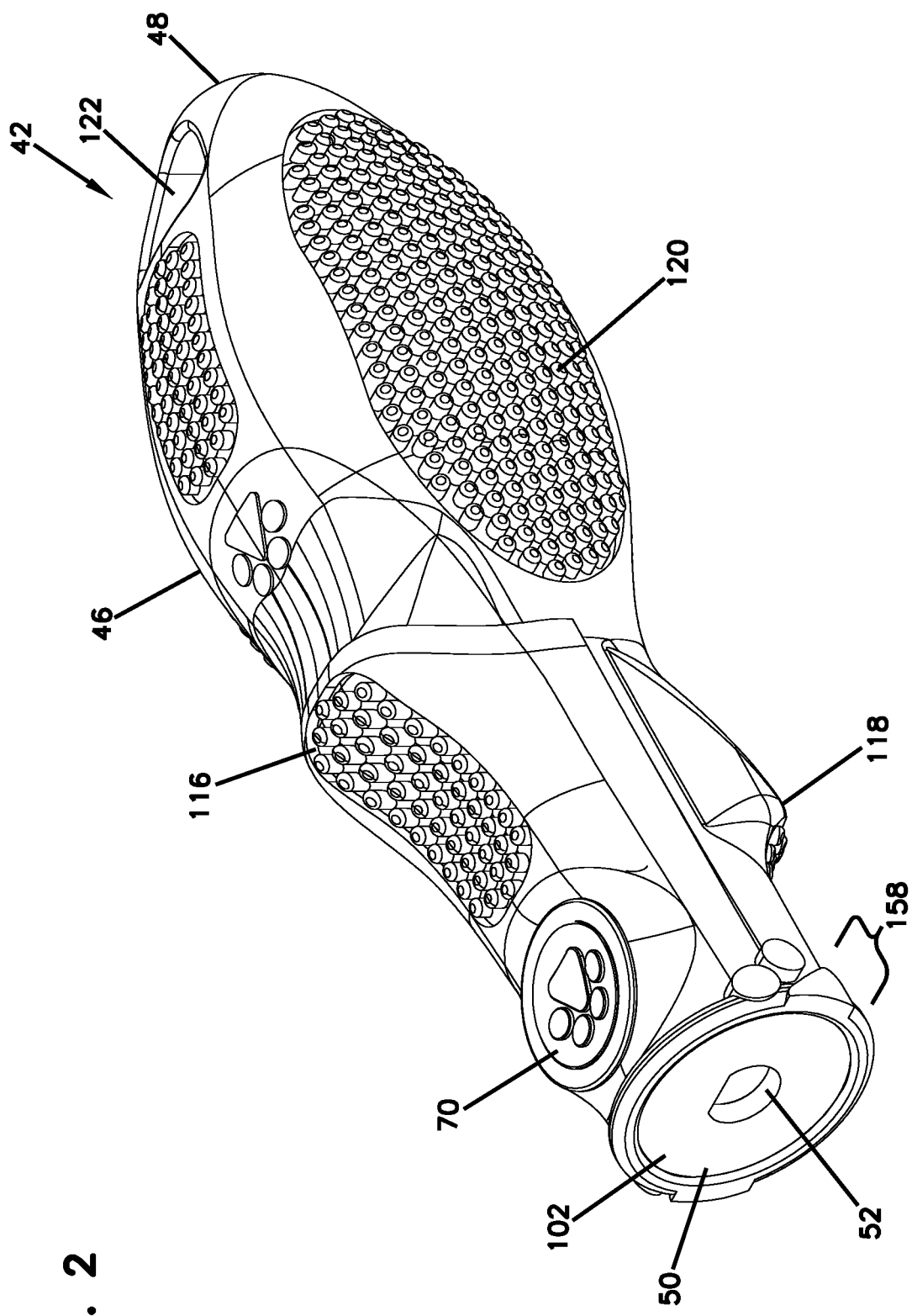
FIG. 2 is a perspective view of the handle used in the system of FIG. 1, constructed in accordance with principles of this disclosure.
Figure 3:
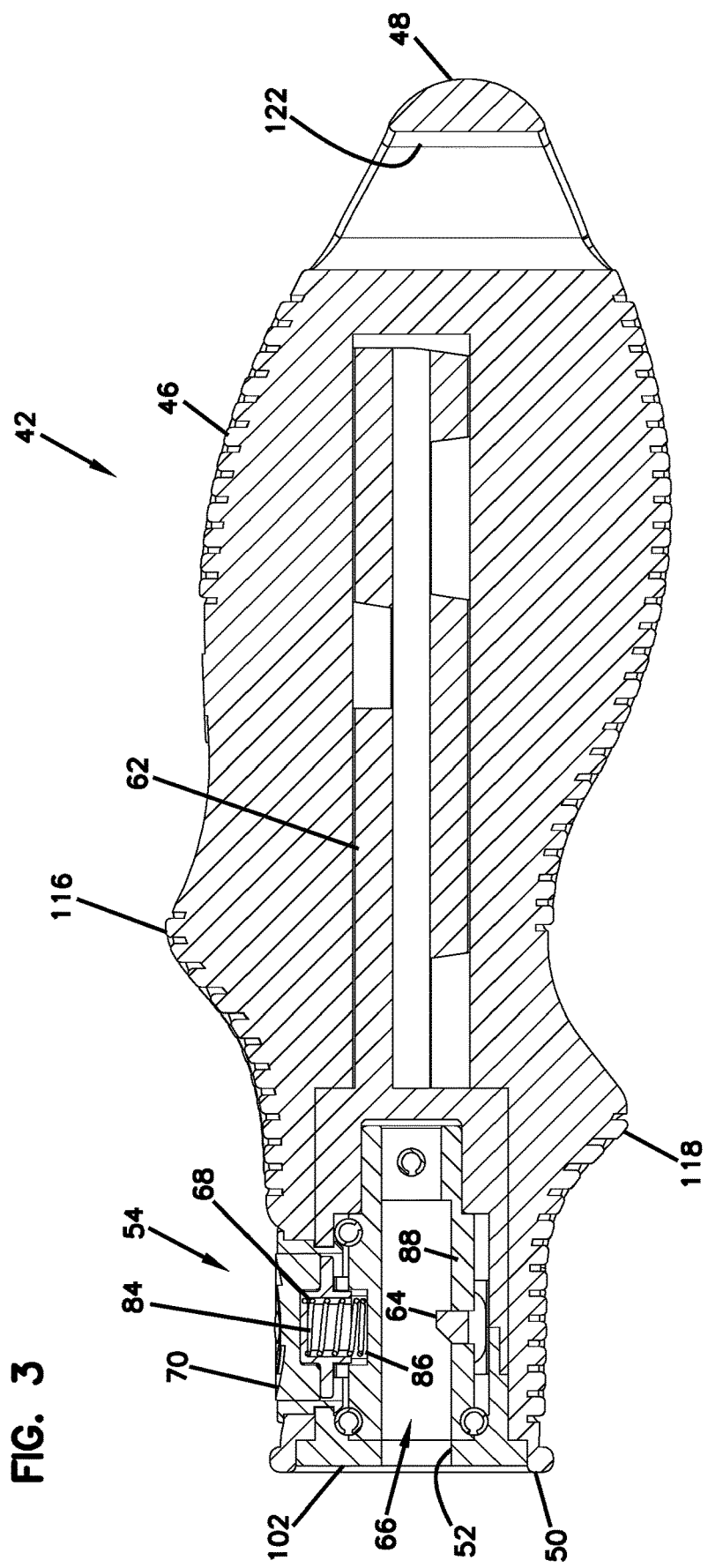
FIG. 3 is a cross sectional view of the handle of FIG. 2.
Figure 4:
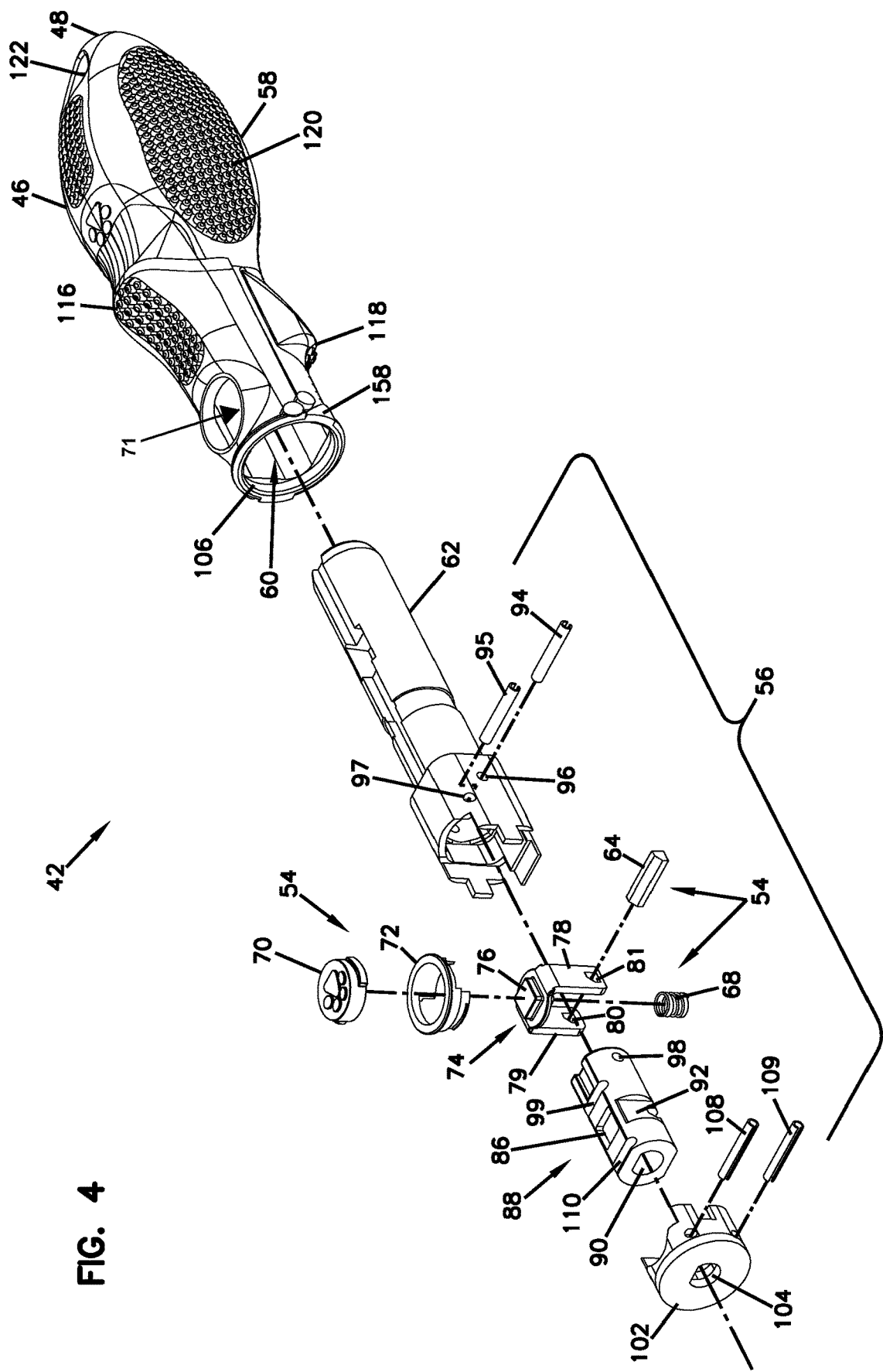
FIG. 4 is an exploded perspective view of the handle of FIGS. 2 and 3.
Figure 5:
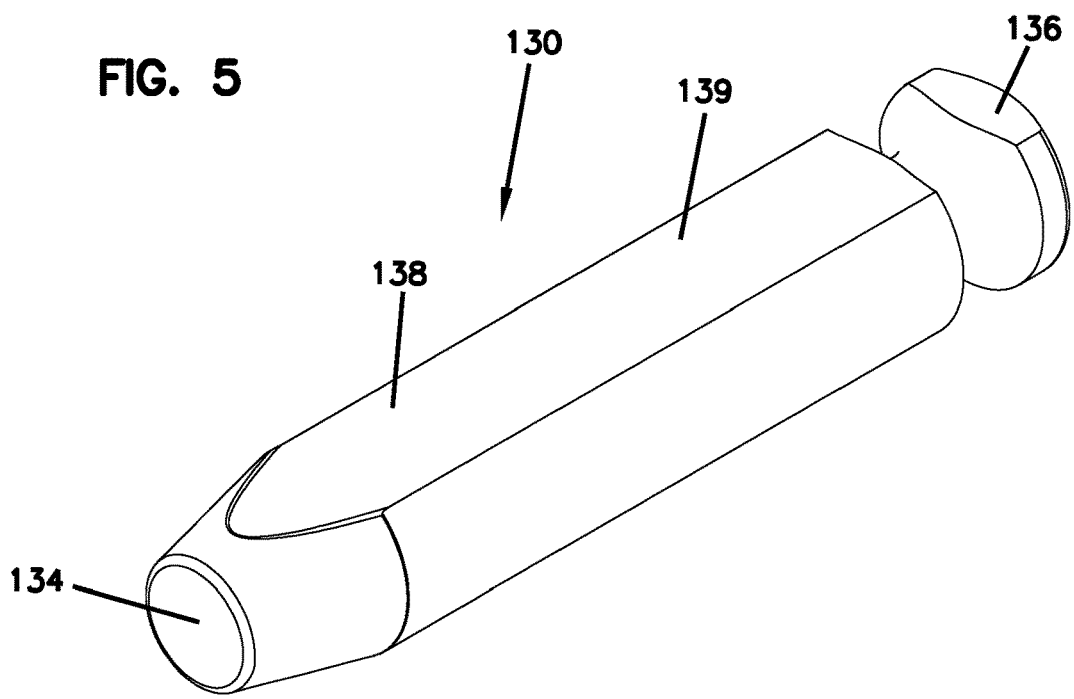
FIG. 5 is a first perspective view of a post secured to each of the tools used in the system of FIG. 1 for securing to the handle of FIG. 1, constructed in accordance with principles of this disclosure.
Figure 6:
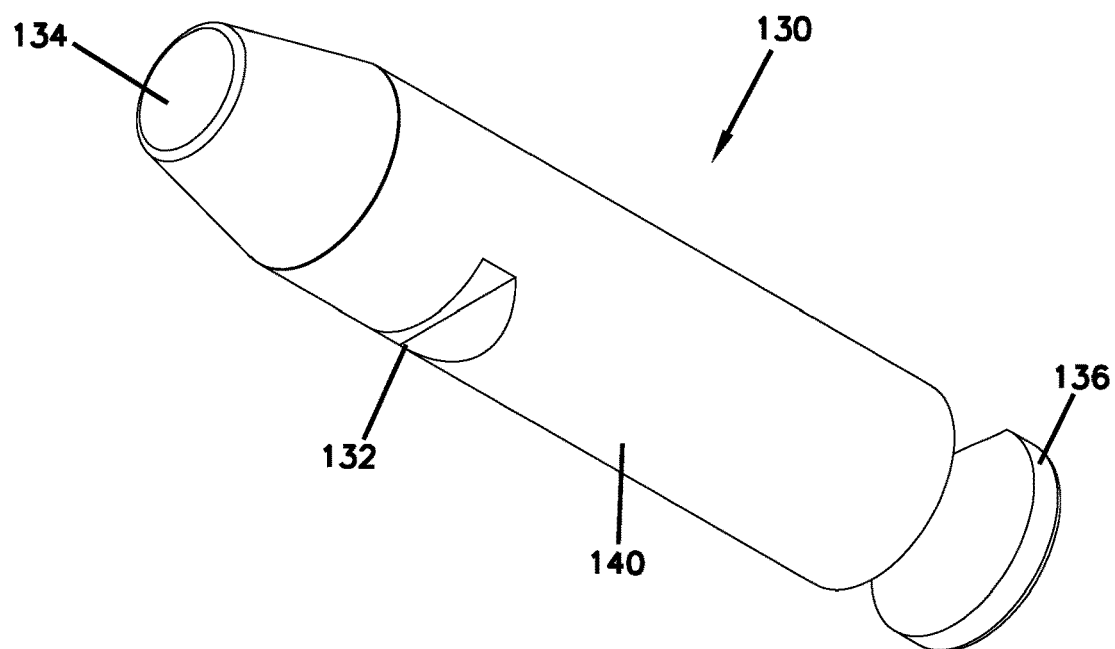
FIG. 6 is another perspective view of the post of FIG. 5.
Figure 7:
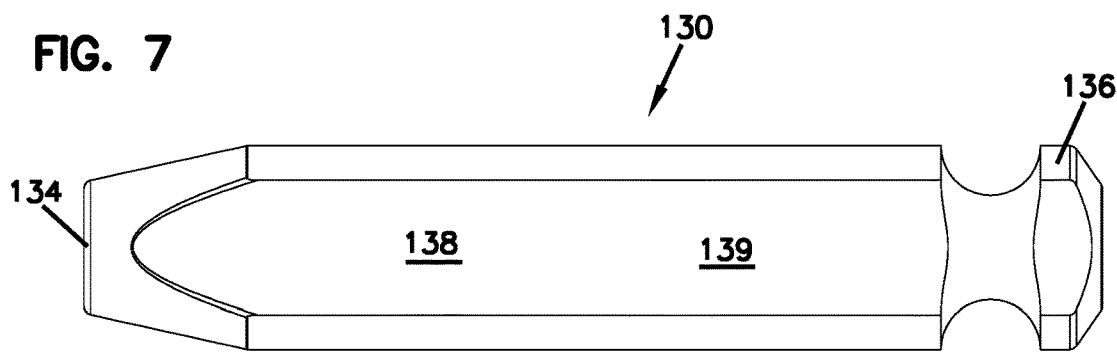
FIG. 7 is a top plan view of the post of FIG. 5.

Turning now to FIGS. 2-4, an example embodiment of handle 42 is depicted. Handle 42 includes a grip 46. The grip 46 is generally sized to be grasped by a human hand. For example, the grip 46 can have an overall length of 3.5-5 inches, for example about 4.25-4.75 inches. The width at its widest part can be about 0.75-1.75 inches, for example about 1-1.5 inches.

The grip 46 has a free end 48 and an opposite tool-receiving end 50. The example lengths above would extend between the free end 48 and the tool-receiving end 50. The tool-receiving end 50 interfaces with the various tools 44 as shown in FIG. 1. The free end 48 is the end of the grip 46 that is opposite from the tool-receiving end 50.

The grip 46 includes a tool-receiving bore 52. The bore 52 is through the tool-receiving end 50.

The handle 42 further includes a lock mechanism 54 (FIGS. 3-4). The lock mechanism 54 is to secure one of the tools 44 within the bore 52. The lock mechanism 54 will selectively release the tool 44 from the bore 52.

Turning now to FIG. 4, an exploded perspective view of the handle 42 is depicted. In the exploded perspective view, the handle 42 can be seen showing the grip 46 and internal components 56. The grip 46 includes, in preferred embodiments, a molded polymer material 58 to enhance friction between the grip 46 and a human hand. The molded polymer material 58 includes, in this example, ergonomic features to help with the comfort of the grip. Example preferred features are discussed further below. The grip 46 includes a cavity 60 that is used to receive the internal components 56.

The internal components 56 include a shaft insert 62. The shaft insert 62 can extend, in general, the length of the grip 46 between the tool-receiving end 50 and the free end 48. The shaft insert 62 helps to provide solid support for the grip 46. The shaft insert 62 also is used to help support and connect other components, including the lock mechanism 54.

Turning again to FIG. 3, the lock mechanism 54 includes a pin 64. The pin 64 extends into an interior volume 66 of the bore 52.

In preferred arrangements, the pin 64 is spring biased. For example, a spring 68 (FIG. 4) can be used to bias the pin 64 radially inwardly into the interior volume 66 of the bore 52.

In FIGS. 3 and 4, it can be seen how the handle 42 further includes a push button 70. The push button 70 is usable to move the pin 64 at least partially out of the interior volume 66 of the bore 52. For example, when the pin 64 is biased with spring 68 into the interior volume 66 of the bore 52, the push button 70 can be used to push against the bias of the spring 68, which will move the pin 64 radially outwardly in a direction outside of the bore 52, or at least partially outside of the bore 52.

In FIGS. 2 and 3, in this embodiment, the push button 70 is depicted as being near the tool-receiving end 50. For example, the push button 70 can be immediately adjacent to the tool-receiving end 50.

Turning again to the exploded perspective view of FIG. 4, an example embodiment of usable internal components 56 is depicted. It should be understood that many variations are possible, and this is only one possible variation that is depicted. In the embodiment shown, the push-button 70 is supported by a lock ring 72. The lock ring 72 is used to secure the push button 70 in the handle 42.

A push button saddle 74 is provided to translate a pushing force on the push button 70 to the pin 64. The push button saddle 74 is operably mounted to support the lock ring 72. The push button saddle 74 includes a projection 76 that can be used to seat the push button 70.

The push button saddle 74 includes a pair of arms 78, 79 extending from the piece holding the projection 76. The arms 78, 79 are depicted as generally parallel and opposing each other. The arms 78, 79 each include an aperture 80, 81. The apertures 80, 81 receive the pin 64.

In this example embodiment, when the push button 70 is pressed, the force translates from the button 70 on to the push button saddle 74 which moves the pin 64 in a direction out of the interior volume 66 of the bore 52. Many variations are possible.

Still in reference to FIG. 4, spring 68 is mounted against the pin 64 and in a manner that will bias the pin 64 into the volume 66 of the bore 52. FIG. 3 shows the pin 64 in a position of being biased into the interior volume 66 of the bore 52. The spring 68 is located between and against an interior side 84 (FIG. 3) of the push button saddle 74 and a spring seat 86. Many embodiments are possible and this is just one example.

The spring seat 86 can be part of a component holder 88. The component holder 88 helps to secure the various internal components within the shaft insert 62 and within the grip 46. The component holder 88 defines an open volume 90 which forms the lining of the bore 52.

In FIG. 4, in this embodiment, an upper surface of the component holder 88 defines the spring seat 86 as a recessed region that holds the spring 68. Extending along the opposite lateral sides of the component holder 88 are indented slots 92. The slots 92 are seats for the arms 78, 79 of the push button saddle 74. The slots 92 allow the arms 78, 79 to move in a direction up and down relative to the component holder 88. This allows the pin 64 to move up and down, which will move the pin 64 radially inwardly and outwardly of the bore 52. Many variations can be made, and this is just one example depicted of the many possibilities.

Still in reference to FIG. 4, the component holder 88 can be secured to the shaft insert 62 by a holding pin 94. The holding pin 94 will extend through a hole 96 in the shaft insert 62, then through a hole 98 in the component holder 88. The holding pin 94 emerges through a hole similar to hole 98 on an opposite side of the component holder 88 and through another hole on an opposite side of the shaft insert 62. Many variations can be made.

A holding pin 95 extends through a hole 97 in the shaft insert 62 and rests in a groove 99 in the component holder 88. Many variations are possible.

In FIG. 4, internal component 64 also includes cover insert 102. Cover insert 102 defines the tool-receiving end 50 of the handle 42. Cover insert 102 includes an opening 104. The opening 104 is in communication with and can form a portion of the bore 52. The opening 104 will be in communication with the open volume 90 of the component holder 88. Many variations are possible.

The cover insert 102 is received by and fits within an open mouth 106 of the grip 46. The cover insert 102 is engaged against the component holder 88. Locking pins 108, 109 are used to secure the cover insert 102 to the component holder 88. In FIG. 4, it can be seen how the component holder 88 includes a groove 110 along an upper portion, in which the locking pin 108 will rest. The component holder 88 has a similar groove like 110 on an opposite side of the component holder 88 for holding the locking pin 109.

In preferred arrangements, the bore 52 will be shaped to index tool 44 that is secured to the handle 42 in a specific direction or orientation. Many variations are possible. In this embodiment, the bore 52 will have a cross sectional opening in the shape of a truncated circle. This can be seen, for example, in FIGS. 2 and 4, in which the opening 104 of the cover insert 102 has the shape of a circle that is cut off or truncated from an upper quarter or so of the circle. When a tool 44 having an appropriately shaped post is inserted into the bore 52, this shape of the bore 52 will not accept the tool 44 unless it is oriented in a particular configuration that will allow the tool 44 to be inserted and received within the bore 52.

The interior wall of the bore 52 will also preferably be shaped to index the tool 44. For example, the interior wall, shown in this example as being the interior wall of the component holder 88, has a cross sectional shape of a truncated circle. Many different variations are possible, and this is just one example depicted.

In reference to FIGS. 2 and 3, example features to improve the comfort and handling of the grip 46 are described. Many variations are possible and these are just examples.

The handle 42 may include a ramped thumb-rest 116. The ramped thumb-rest 116 can be spaced between the free end 48 and the push button 70. The thumb-rest 116 will typically be on a same side of the grip 46 as the push button 70. The handle 42 may further include a ramped index finger-rest 118. The index finger-rest 118 is between the free end 48 and the push button 70. The index finger-rest 118 will be on an opposite side of the grip 46 as the push button 70.

In the example embodiment depicted, the index finger-rest 118 is located between the push-button 70 and the thumb-rest 116.

In the example depicted, the handle 42 may further include a multiple finger-rest 120. The multiple finger-rest 120 will be between the free end 48 and the index finger-rest 118. The multiple finger-rest 120 can be located on a lateral side of the grip 46 between the side of the index finger-rest 118 and the side of the thumb-rest 116. The multiple finger-rest 120 can be used, for example, to support and rest the middle finger, ring finger, and pinky of a human hand when grasping the grip 46.

In the embodiment depicted, the multiple finger-rest 120 is located between the thumb-rest 116 and the free end 48.

In some embodiments, the grip 46 can further include a mounting hole 122. The mounting hole 122 is depicted as being adjacent to the free end 48. In this embodiment, the mounting hole 122 is a complete through hole through the handle 42. In this manner, the handle 42 can be hung on a mounting hook that will pass through the hole 122. Alternatively, the mounting hole 122 can accommodate a mounting strap, chain, or any other component that is convenient to pass through the hole 122.

B. Example Post

The system 40 includes the handle 42 and a grooming and hair collection tool 44, examples of which are depicted in FIG. 1.

In preferred arrangements, the tool 44 includes a post 130. The post 130 can be sized to fit within the bore 52 of the handle 42. In FIG. 1, the post 130 is shown extending or projecting from each of the tools 44 depicted.

Many embodiments are possible. FIGS. 5-10 depict an example embodiment of a usable post 30, which can be used to removably secure the tool 44 to the handle 42.

The post 130 includes a recess or detent 132. The detent 132 is sized and shaped to receive the pin 64 (FIGS. 3 and 4) of the lock mechanism 54.

Figure 8:
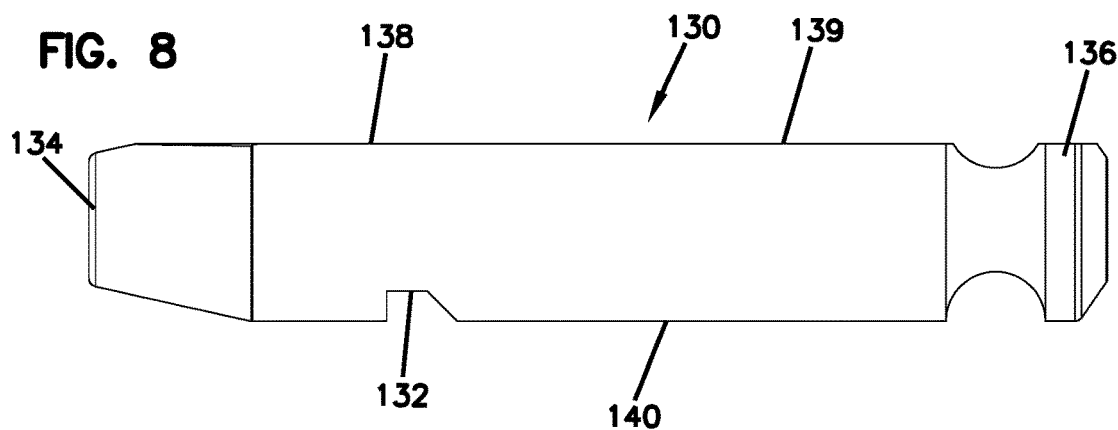
FIG. 8 is a side view of the post of FIG. 5.
Figure 9:
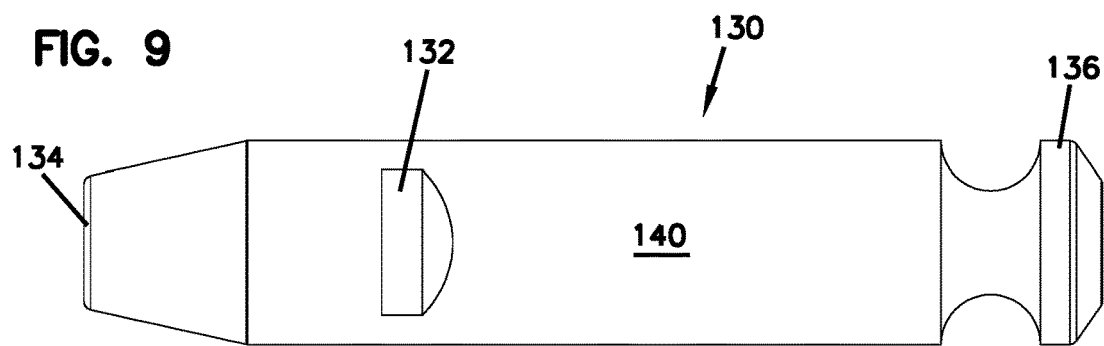
FIG. 9 is a bottom plan view of the post of FIG. 5.
Figure 10:
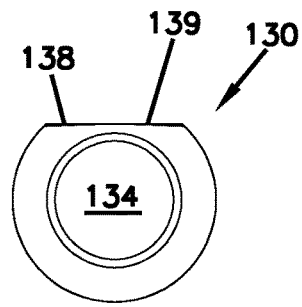
FIG. 10 is an end view of the post of FIG. 5.

In the example shown in FIG. 8, it can be seen how the detent 132 has a profile that is trapezoid-shaped, when viewed from the side. The detent 132 will receive the pin 64, which will lock the post 130 axially in place within the bore 52 when the pin 64 is in the locked position. When it is desired to release or unlock the tool from the handle 42, the push button 70 is pressed, which moves the pin 64 radially outwardly from the bore 52, and this will disengage the locking pin 64 from the detent 132.

The post 130 has a free end 134. The free end 134 of the post 130 is the portion of the post 130 that will initially enter the bore 52, when connecting tool 44 with the handle 42.

At an end opposite of the free end 134 is a tool end 136. The tool end 136 will be secured to the tool 44. The tool end 136 can be secured to the tool 44 in many different manners, such as being molded or adhesively bonded to a remaining portion of the tool 44. Many ways are possible.

The detent 132 will typically be spaced less than 0.5 inches from the free end 134. The detent 132 can be spaced more than 0.25 inches from the free end 134.

In one or more preferred embodiments, the post 130 is shaped to be received within the bore 52 for engagement with the pin 64 in only a single orientation. Many different embodiments are possible.

In the example embodiment shown, at least one side 138 of the post 130 has a flat surface 139. In the example depicted, the side 140, having the detent, 132 is opposite of the side 138 having the flat surface 139.

From a review of FIGS. 2, 4, and 5-10, it should be understood how the shape of the bore 52 and the shape of the post 130 allows for insertion of the post 130 into the bore 52 in only one orientation. This will ensure that the detent 132 is located in proper orientation for engagement with the pin 64 of the lock mechanism 54. Many variations are possible, and this is just one possibility of many.

The post 130 can be many sizes and shapes. In this example, the post 130 is at least 0.5 inches in length. Typically, in this example, the post 130 is not greater than 2 inches in length. A portion of the post 130 that will be the portion exposed and projecting from a remainder of the tool 44 will typically be not greater than 1 inch in length. The post 130 can have a greatest cross sectional dimension across its width, for example, between side 138 and side 140 of greater than ⅛ inch. The post 130 can have a greatest cross sectional dimension across the width, such as between side 138 and 140, of less than 0.25 inch.

C. Example System and Methods

Turning again to FIG. 1, the various tools 44 depicted will preferably include the post 130 extending or projecting therefrom for engagement and releasable connection with the handle 42. The tools 44 can include a deshedding tool 142. The deshedding tool 142 can include a tool used to engage loose hair to pull it from the animal without cutting or pulling non-loose hair. For example, it can be the type of tool described in U.S. Pat. Nos. 7,509,926; 6,782,846; 7,077,076; 7,222,588; 7,334,540; 7,509,926; each being incorporated herein by reference in its entirety. The deshedding tool 142 is depicted in different sizes at 143, 144, and 145.

The tool 44 can also include a brush 148. The brush 148 can be, for example, a slicker brush. The brush may also be a combination brush, such as shown at 149.

The tool 44 may also include one of a mat breaker 150. Example preferred embodiments of mat breaker 150 are described further below.

The tool 44 may also include a comb 152. The comb 152 can have many variations.

The tool 44 can also include a hair collection tool such as a fur sweeper tool 154. Examples of preferred fur sweeper tools 154 are described further below.

The tool 44 can also include a hair collection tool such as a fur accumulator tool 156. An example of a preferred embodiment of a fur accumulator tool 156 tool is described further below.

A method for using the system 40 can include providing a handle. For example, the handle can be universal handle 42 as described in connection with FIGS. 2-4. The method can include selecting a grooming or hair collection tool 44. The method can include releasably securing the selected tool 44 to the handle 42.

Providing the handle 42 can include providing the handle as variously described and characterized above, including some or all of the features described. The handle 42 preferably includes bore 52 and lock mechanism 54.

In the method, the step of selecting a grooming or hair collection tool 44 can include selecting tool 44 having post 130 with detent 132.

The step of releasably securing the selected tool 44 can include inserting the post 130 into the bore 52 and engaging the pin 64 and detent 132.

The step of inserting the post 130 into the bore 52 can include inserting the post 130 that is shaped to be received within the bore 52 for engagement with the pin 64 in only a single orientation. For example, the bore 52 can include the shape of a truncated circle, while the post 130 can include a flat surface 139 along one of the sides 138. This will orient the post 130 to be received within the bore 52 in only one orientation.

The method can include, after the step of releasably securing the selected tool 44 to the handle 42, releasing the selected tool 44 from the handle 42 by pressing the press button 70.

Pressing the push button 70 can include moving the pin 64 from the detent 132 in the post 130.

In one example method, pushing the push button 70 will push against the spring 68, which will move the saddle 74, which will translate into moving the pin 64 radially outwardly of the bore 52. This will release the pin 64 from the detent 132 and allow the post 130 to be axially removed from the bore 52.

The step of releasably securing the tool 44 may include making an audible click sound as the tool 44 and handle 42 engage. For example, when the pin 64 snaps in to place in the detent 132, it can make an audible click noise. The user will then know that the tool 44 has been locked to the handle 42.

The step of selecting a grooming or hair collection tool can include selecting from the group comprising a deshedding tool 142-145, brush 148, 149, mat breaker 150, fur sweeper tool 154, fur accumulator tool 156, and comb 152.

The step of selecting a grooming or hair collection tool may also include selecting from the group consisting of a deshedding tool 142-145, brush 148, 149, mat breaker 150, fur sweeper tool 154, fur accumulator tool 156, and comb 152.

The method can also include, during the step of releasably securing the selected tool, orienting a first distinct visual mark 158 on the handle 42 with a second distinct visual mark 160 on the tool 44. This will help inform the user that they have properly aligned and connected the tool 44 with the handle 42.

The step of orienting first distinct visual mark 158 on the handle 42 with second distinct visual mark 160 on the tool 44 can include forming a resulting third distinct visual mark 162 from the first and second marks 158, 160. For example, in FIG. 11, an example resulting third distinct visual mark 162 can be seen when the first mark 158 and second mark 160 are aligned. Many embodiments are possible. In this example, the resulting third distinct visual mark 162 shows a paw print. The paw print 162 is made from half a paw in the first mark 158 and the other half of the paw in the second mark 160. While many variations are possible, each of the marks 158, 160, 162 are eye catching and attractive. In addition, while many variations are possible, these marks, 158, 160, 162 are also distinctive.

D. Example Mat Breaker

In FIGS. 11-19, an example embodiment of mat breaker 150 is illustrated. Mat breaker 150 is one of the tools 44 that can be used in the system 40 and removably connect to the handle 42.

The mat breaker 150 can be used on an animal with a coat of fur to break or remove hair or fur that is matted together. The mat breaker 150 can remove the mat in the hair by either cutting the matted section or otherwise untangling or removing the mat.

Figure 11:
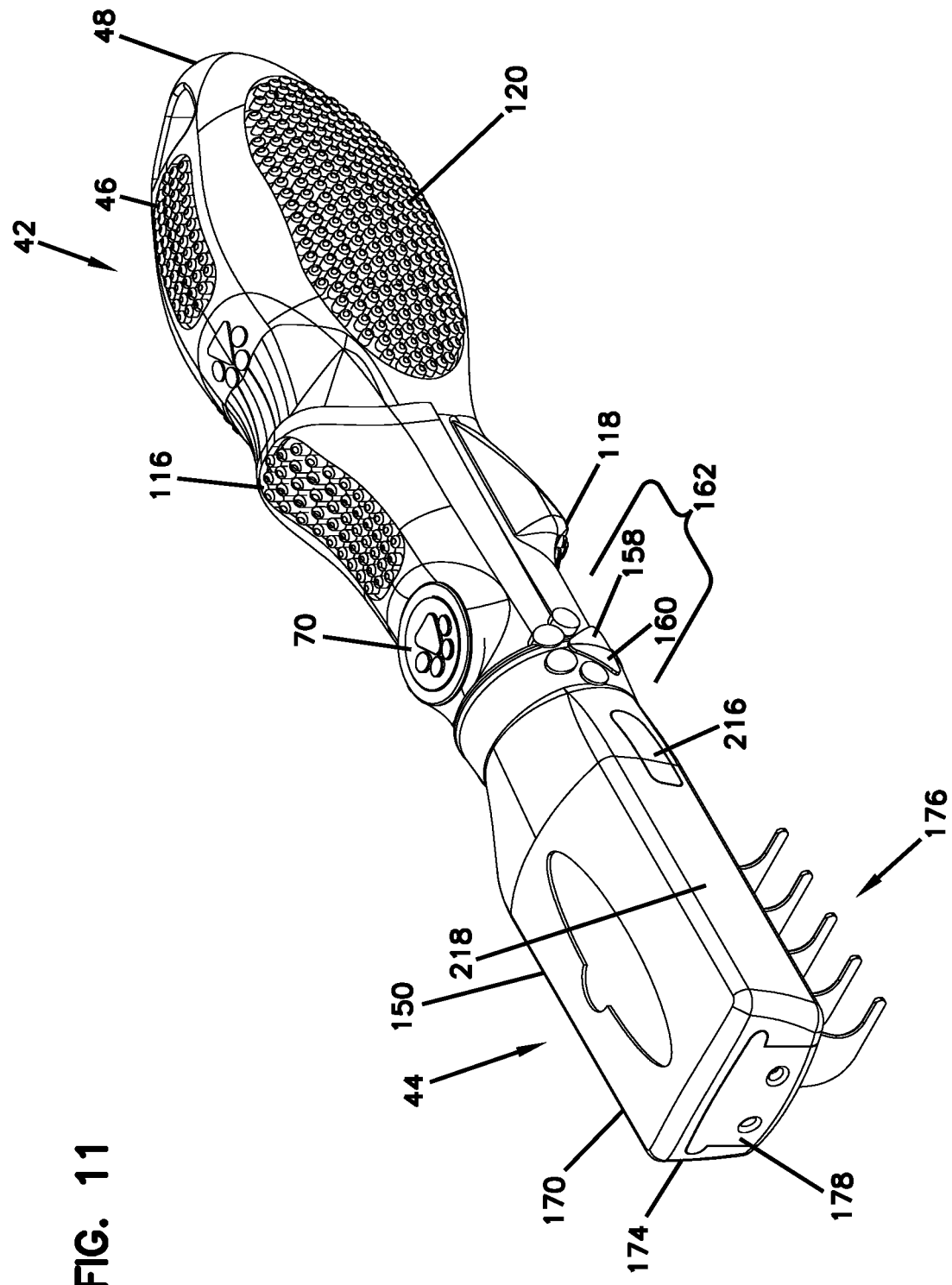
FIG. 11 is a perspective view of a mat breaker secured to the handle of FIG. 2, constructed in accordance with principles of this disclosure and depicting a lock mechanism in a locked and engaged position.
Figure 12:
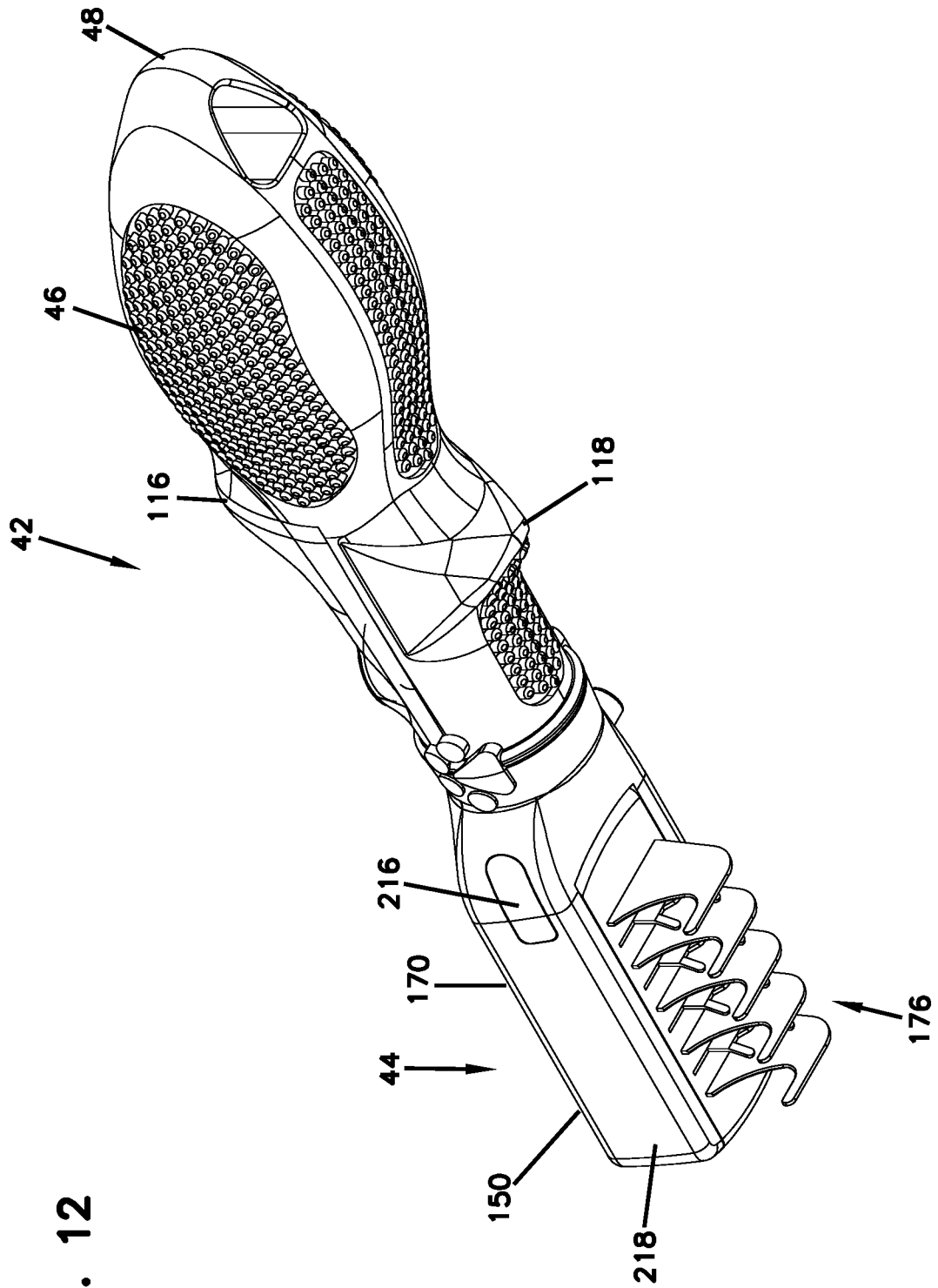
FIG. 12 is another perspective view of the mat breaker and handle of FIG. 11.
Figure 13:
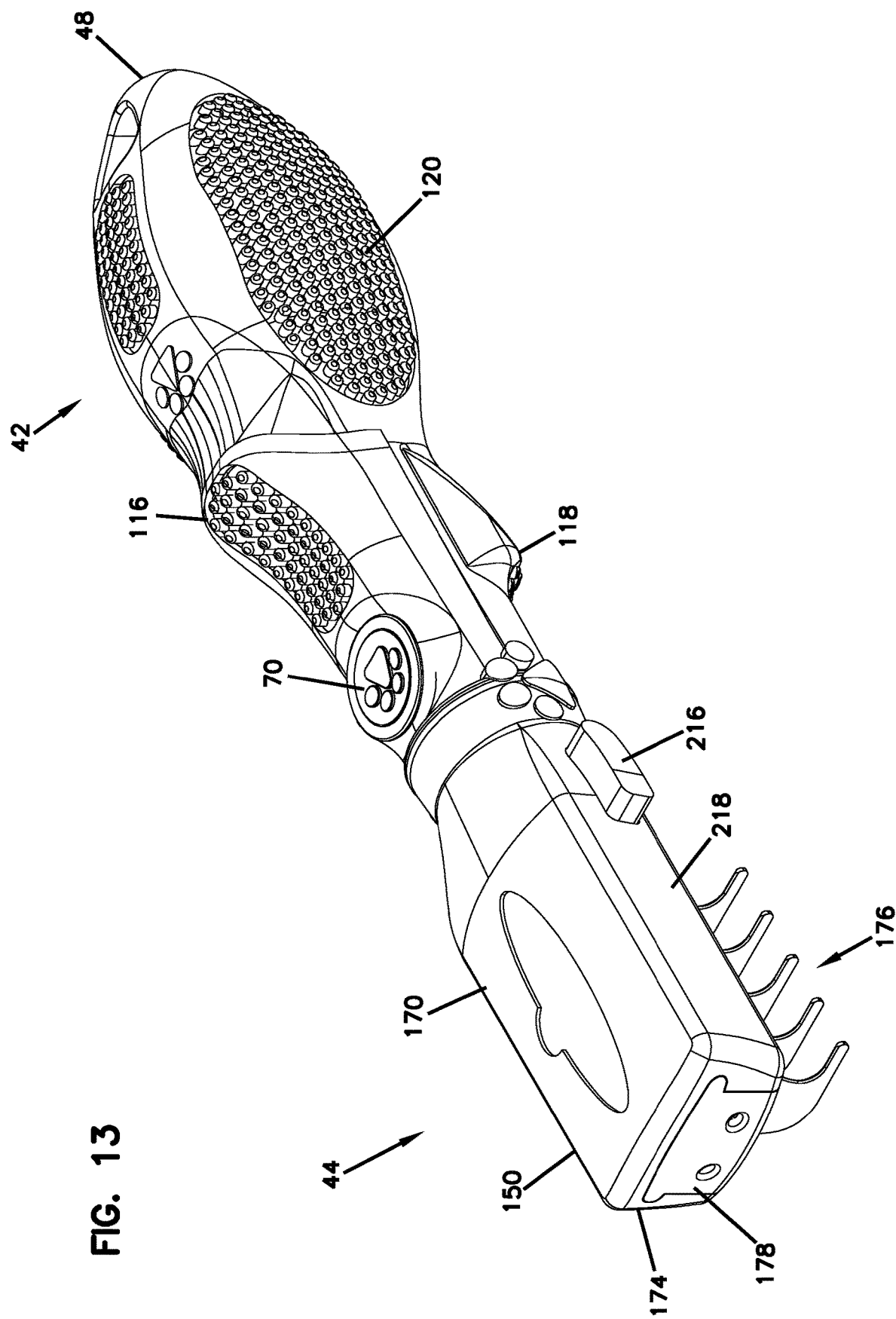
FIG. 13 is another perspective view of the mat breaker and handle of FIG. 11, and depicting a lock mechanism in an unlocked position.
Figure 14:
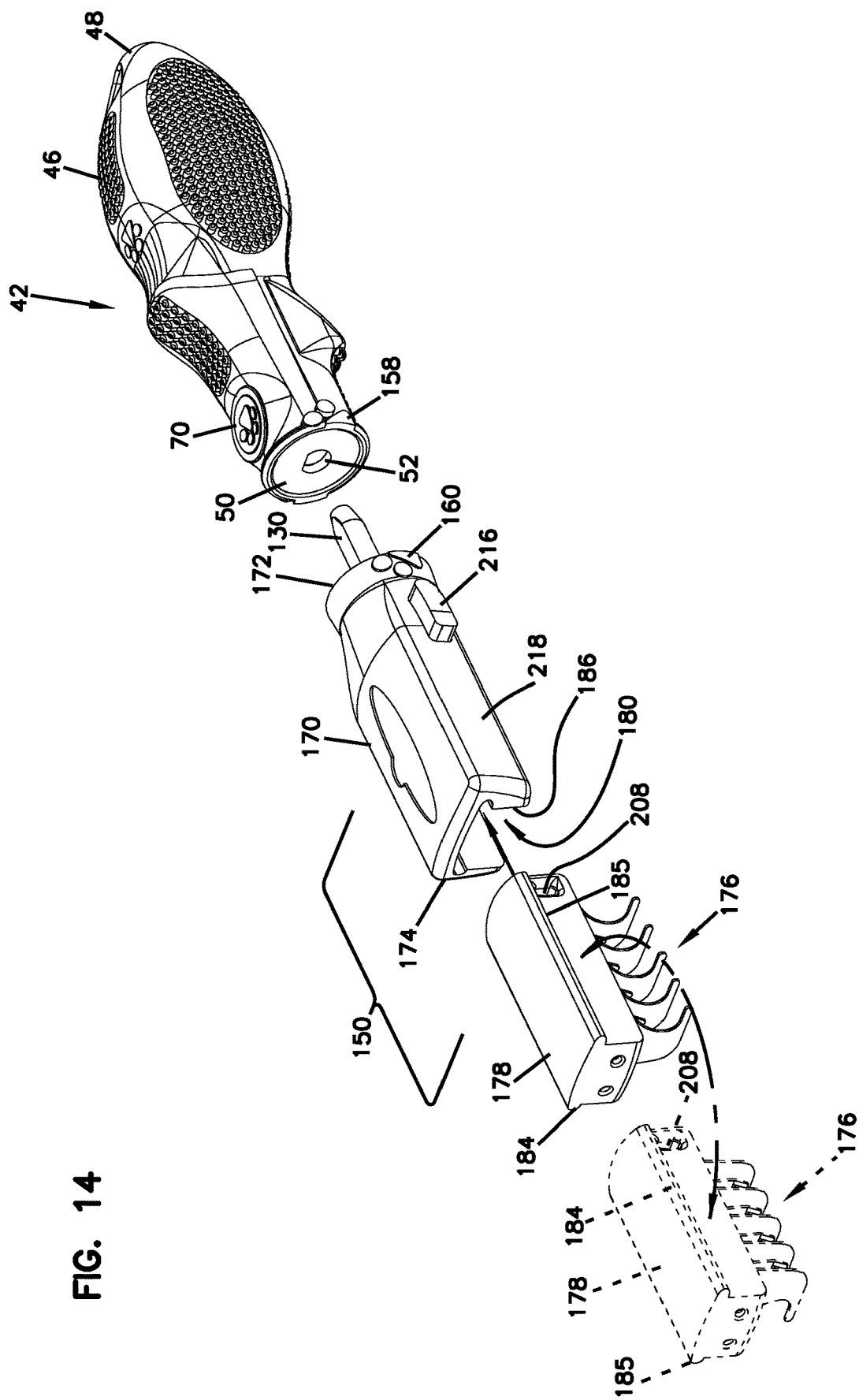
FIG. 14 shows an exploded perspective view of the mat breaker and handle of FIGS. 11-13, and showing how the teeth can be reversed in orientation.

FIGS. 11-13 show the mat breaker 150 connected or secured to the handle 42. An exploded view of the mat breaker 150 is shown in FIG. 14 as disconnected from the handle 42.

The mat breaker 150 includes a base member 170. The handle-engaging post 130 extends or projects from the base member 170. For example, the base member 170 has opposite ends. One end 172 will have the handle-engaging post 130 extending or projecting axially therefrom. On opposite end 174 can be a free end.

The mat breaker 150 includes a set of curved teeth 176 held in the base member 170. The set of teeth 176 are movable within the base member 170.

For example, in preferred arrangements, the set of curved teeth 176 are movable such that they can be adjusted for either a right handed or left handed person. Because the set of teeth 176 are curved, the direction or orientation of the teeth 176 can be moved to either point a first direction or 180° opposite of the first direction in a second direction. Many embodiments are possible for making the curved teeth 176 movable within the base member 170. An example implementation is further discussed.

Attention is directed to FIG. 14. In this example embodiment, the set of teeth 176 are held by a substrate 178. The substrate 178 is removably oriented in the base member 170. In FIG. 14, it can be seen how the substrate 178 holding the set of teeth 176 can be removed from the base member 170, rotated 180°, and then reinserted within the base member 170. This allows the curved direction of the set of teeth 176 to be adjusted for either right handed or left handed use.

Figure 19:
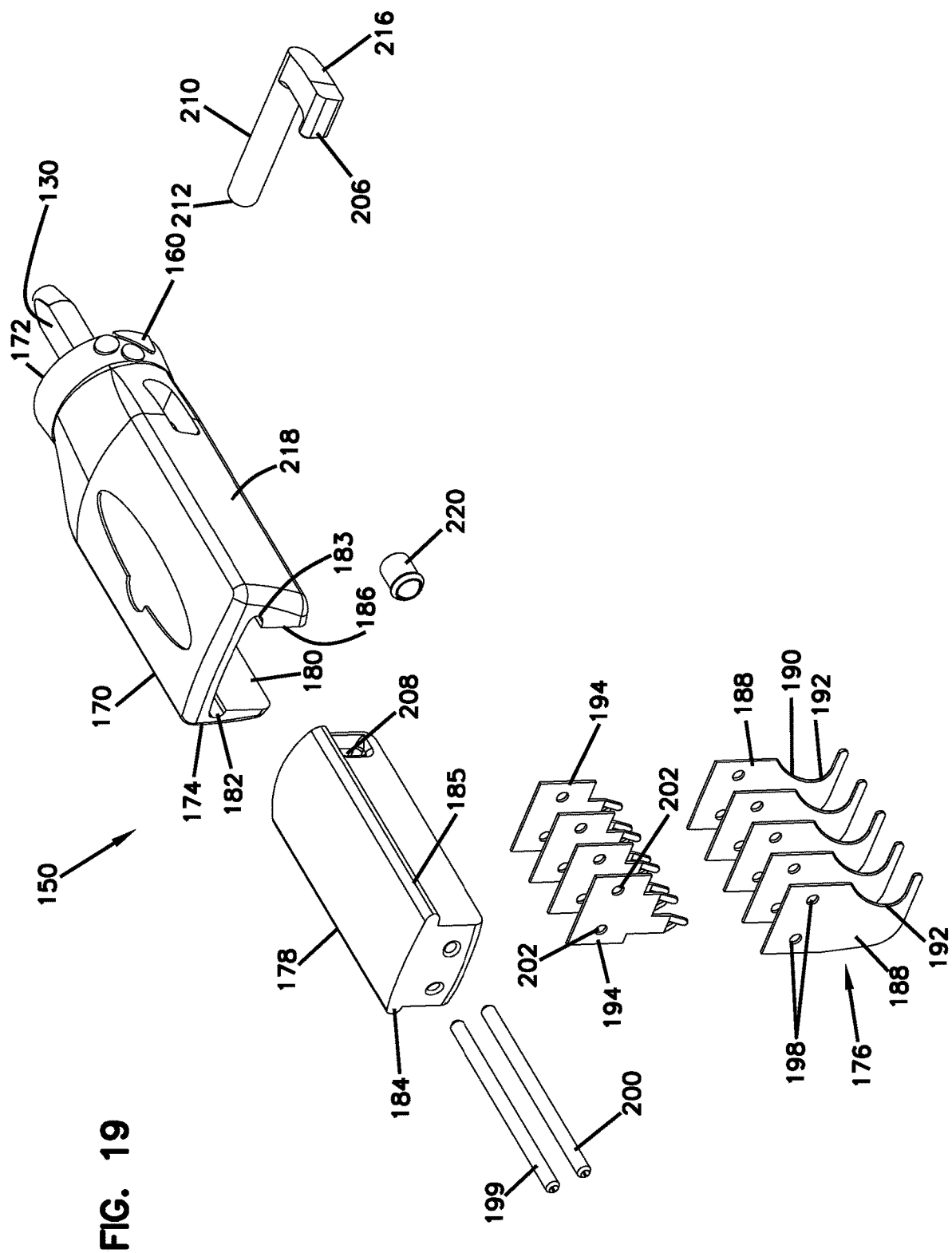
FIG. 19 is an exploded perspective view of the mat breaker used with the handle as shown in FIGS. 11-18.
Figure 20:
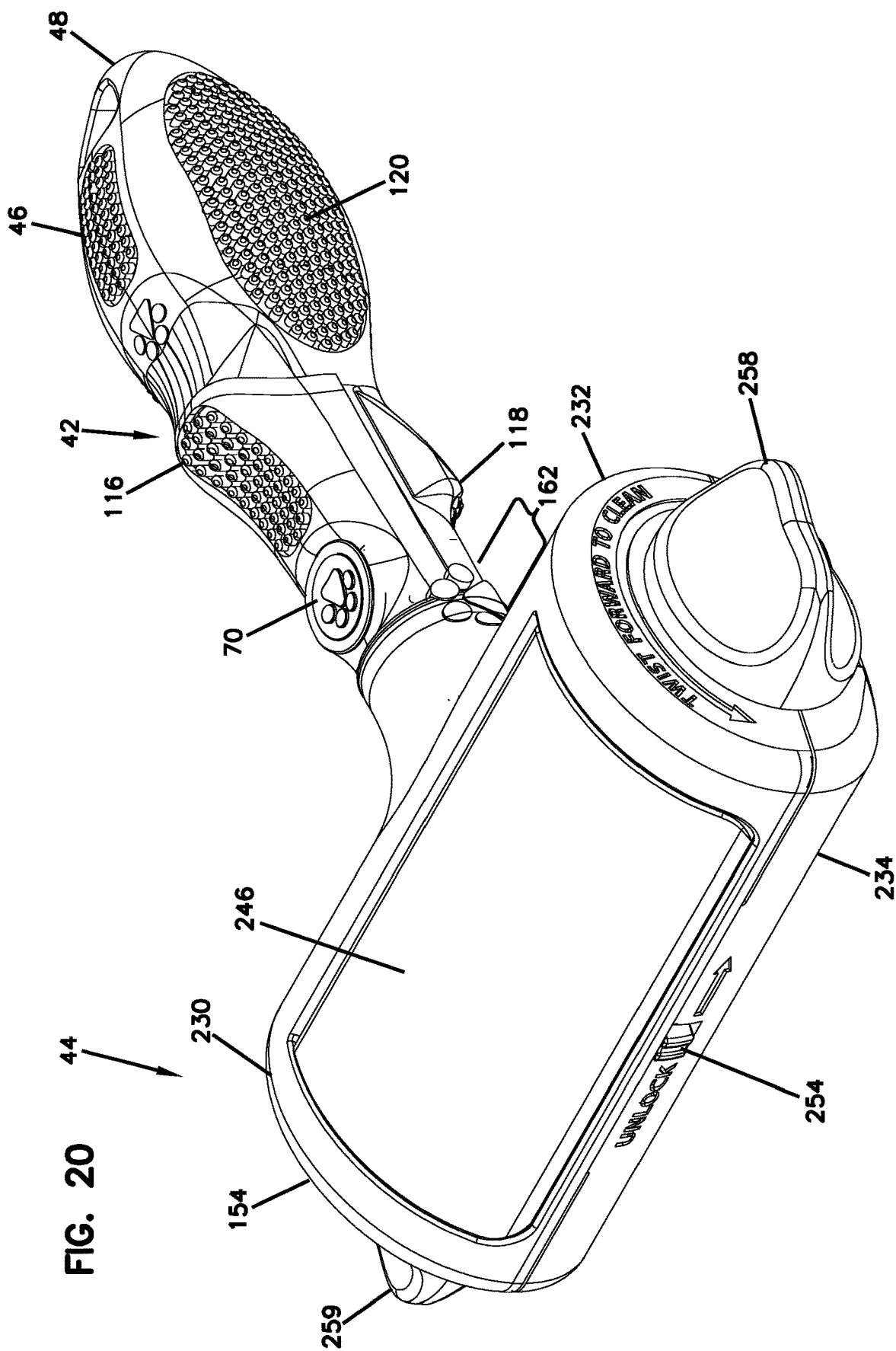
FIG. 20 is a perspective view of a fur sweeper tool used with the handle of FIG. 2, constructed in accordance with principles of this disclosure.

In FIGS. 14 and 19, the base member 170 is depicted as having an open substrate-receiving cavity 180. The cavity 180 is sized and shaped to releasably hold the substrate 178.

Many embodiments are possible for how to have the substrate 178 be removably oriented with the base member 170. In the example shown, the base member 170 defines slide grooves 182, 183 along the side of the cavity 180. The substrate 178 includes rails 184, 185 on opposite sides of the substrate 178 to slide within the grooves 182, 183.

The free end 174 of the base member 170 has an opening 186 or open end that is in full communication with the cavity 180. In this manner, the substrate 178 can slide into the base member 170 by entering the cavity 180 through the opening 186. In the example arrangement shown, the rails 184, 185 slide within the grooves 182, 183. Many variations are possible, and this is just one example.

The set of curved teeth 176 can include many different embodiments. In the example shown in FIG. 19, each tooth 188 in the set 176 has an inside edge 190 comprising a cutting blade 192.

The inside edge 190 of each tooth 188 is depicted in FIG. 19 as curving at an angle. The angle can be between 80-100°. For example, this angle can be about 90°.

There can be at least 3 teeth in the set 176, and up to about 20 teeth in the set 176, depending upon the size of the mat breaker 150. In this example shown, there are 5 individual teeth 188.

In this example, the mat breaker 150 may also include a hair separator blade 194 between adjacent ones of the curved teeth 188. The hair separator blades 194 can be useful in helping to separate the fur or hairs when removing the mats. In the embodiment shown, there is one hair separator blade 194 between each adjacent pair of teeth 188. In this embodiment, the hair separator blades 194 include one or more tangs 196 (FIG. 18) extending radially outwardly from the rest of the blade 194.

Each tooth 188 can be secured to the substrate 178 in a variety of manners. In the embodiment shown, each tooth 188 includes a pair of holes 198 (FIG. 19) through which locking pins 199, 200 can pass through and through the substrate 178 to secure each tooth 188 to the substrate 178.

Each separator blade 194 can be secured to the substrate 178 by using the locking pins 199, 200 to pass through a pair of holes 202 in each separator blade 192. Many variations are possible.

The mat breaker 150 can include a lock mechanism 204 (FIG. 16). The lock mechanism 204 can be used to releasably secure the substrate 178 in operable orientation within the base member 170. In this manner, once the substrate 178 holding the set of teeth 176 has been oriented for either right handed or left handed use, the lock mechanism 204 can be engaged to ensure that the substrate 178 is selectively locked in the base member 170.

Many embodiments are possible. In this embodiment, the lock mechanism 204 includes a pushable finger 206. The lock mechanism 204 also includes a detent 208 on a first side of the substrate 178 and a detent 208' (FIG. 14) on an opposite side of the substrate 178. The detents 208, 208' are sized and shaped to receive the finger 206.

In this embodiment, the pushable finger 206 is secured to a locking arm 210. The pushable finger 206 extends from the locking arm 210. The locking arm 210 is held by and slides within the base member 170, as can be seen in FIG. 16. A free end of the locking arm 210 forms a push member 212 that will either be projecting from or flush with one side 214 (FIG. 16) of the base member 170, depending on whether the locking mechanism 204 is in the locked or unlocked position. In the locked position, such as shown in FIG. 16, the push member 212 projects from and extends from the side 214. In the unlocked or released position, the push member 212 is even or flush with the side 214.

At an opposite end of the push member 212 is a tab 216. The tab 216 extends between the finger 206 and the arm 210. The tab 216 will be either in a position projecting from a side 218 of the base member 170 or even and flush with the side 218. The side 218 of the base member 170 is opposite of the side 214.

When the locking mechanism 204 is in a position locking the substrate 178 in place, the tab 216 is against and flush with the side 218. When the locking mechanism 204 is unlocked, the tab 216 is extending or projecting from the side 218. In FIGS. 11 and 12, the locking mechanism 204 is in the locked position, and the tab 216 is shown even with the side 218. In FIG. 13, the tab 216 can be seen projecting from the side 218, which means that the locking mechanism 204 is unlocked to allow the substrate 178 to be removed from the base member 170.

In FIGS. 16 and 19, a pin 220 can be seen that engages the locking arm 210 to hold it in either its locked position (FIG. 16) or its unlocked position (FIG. 13).

The post 130 is preferably the post having the features as described in section B, above. The description of the post 130 is incorporated here by reference.

A method of using the mat breaker 150 can include removing the set of curved teeth 176 from the base member 170, rotating the set of teeth 176 180°, and then operably securing the set of curved teeth 176 in the base member 170. The method further includes engaging the set of teeth 176 with a mat of fur.

The step of removing can include moving a pushable finger 206 from engagement with the detent 208, 208' in the substrate 178. This can include pushing on the push member 212 which will translate to motion along the locking arm 210, tab 216, and finger 206, which will move the finger 206 from engagement with the detent 208, 208'.

The step of operably securing the set of curved teeth 176 in the base member 170 includes sliding the substrate 178 into the cavity 180 in the base member 170 and pushing the tab 216 to move the finger 206 into engagement with the detent 208, 208' in the substrate 178. For example, pushing the tab 216 will push the finger 206 into engagement with the detent 208. This will also result in the push member 212 extending from the side 214 of the base member 170.

D. Example Fur Sweeper Tool

One of the tools 44 usable in the system 40 for releasably connecting to the handle 42 can include hair collection tool, such as the fur sweeper tool 154. An example embodiment of fur sweeper tool 154 is shown in FIGS. 20-25.

The fur sweeper tool 154 includes a base holder 230. The base holder 230 can include a first half holder 232 and a second half holder 234. The first and second half holders 234 can be connected together to define an open tube 236 (FIG. 25).

Handle engaging post 130 extends or projects from the base holder 230. The post 130 can be the type of post described in section B above, the description which is incorporated herein by reference.

The sweeper tool 154 further includes a roller 238. The roller 238 is held by the base holder 230 and has fur attracting material 240.

The roller 238 is rotatably held within the open tube 236 of the base holder 230.

Figure 21:
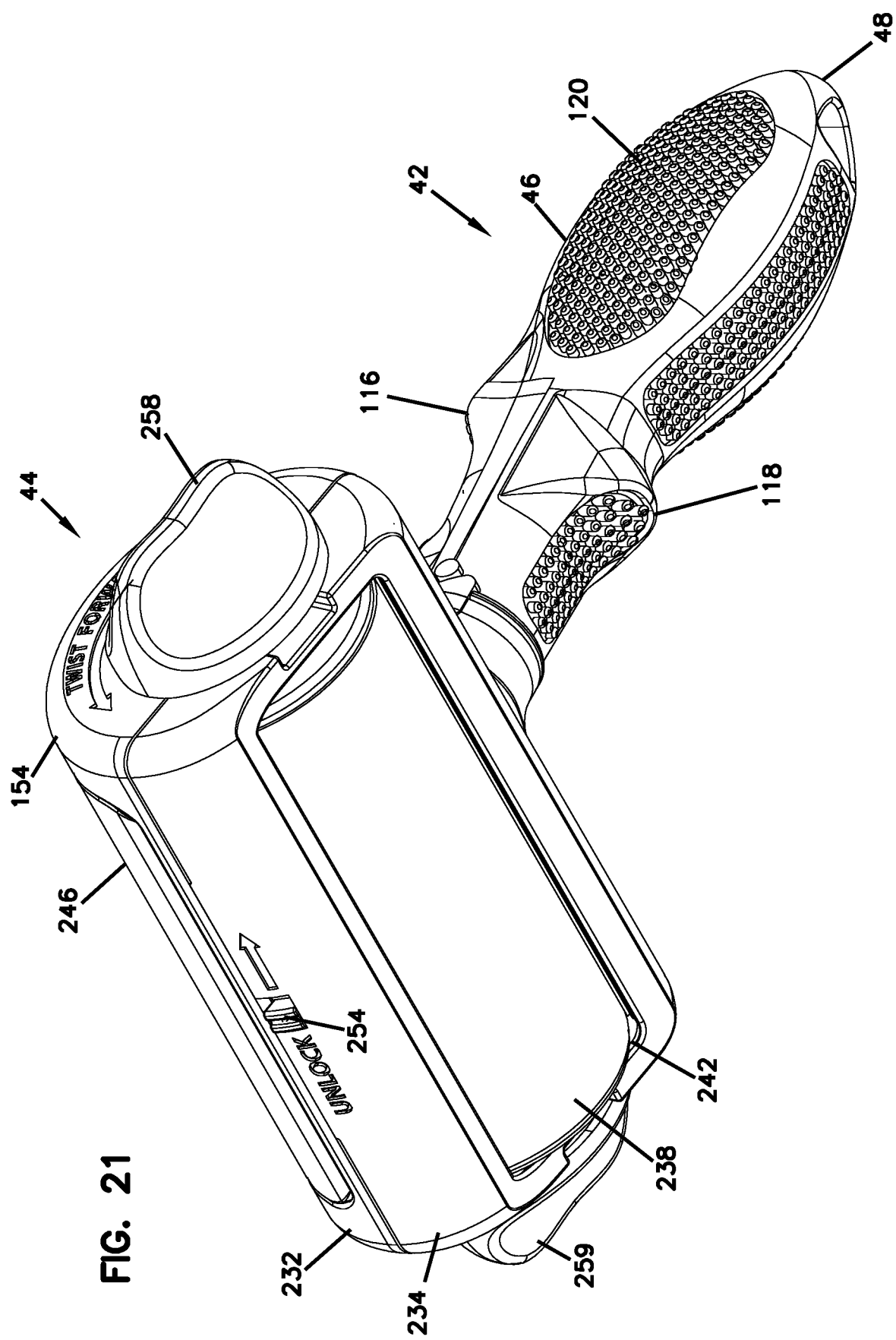
FIG. 21 is another perspective view of the fur sweeper tool and handle of FIG. 20.
Figure 22:
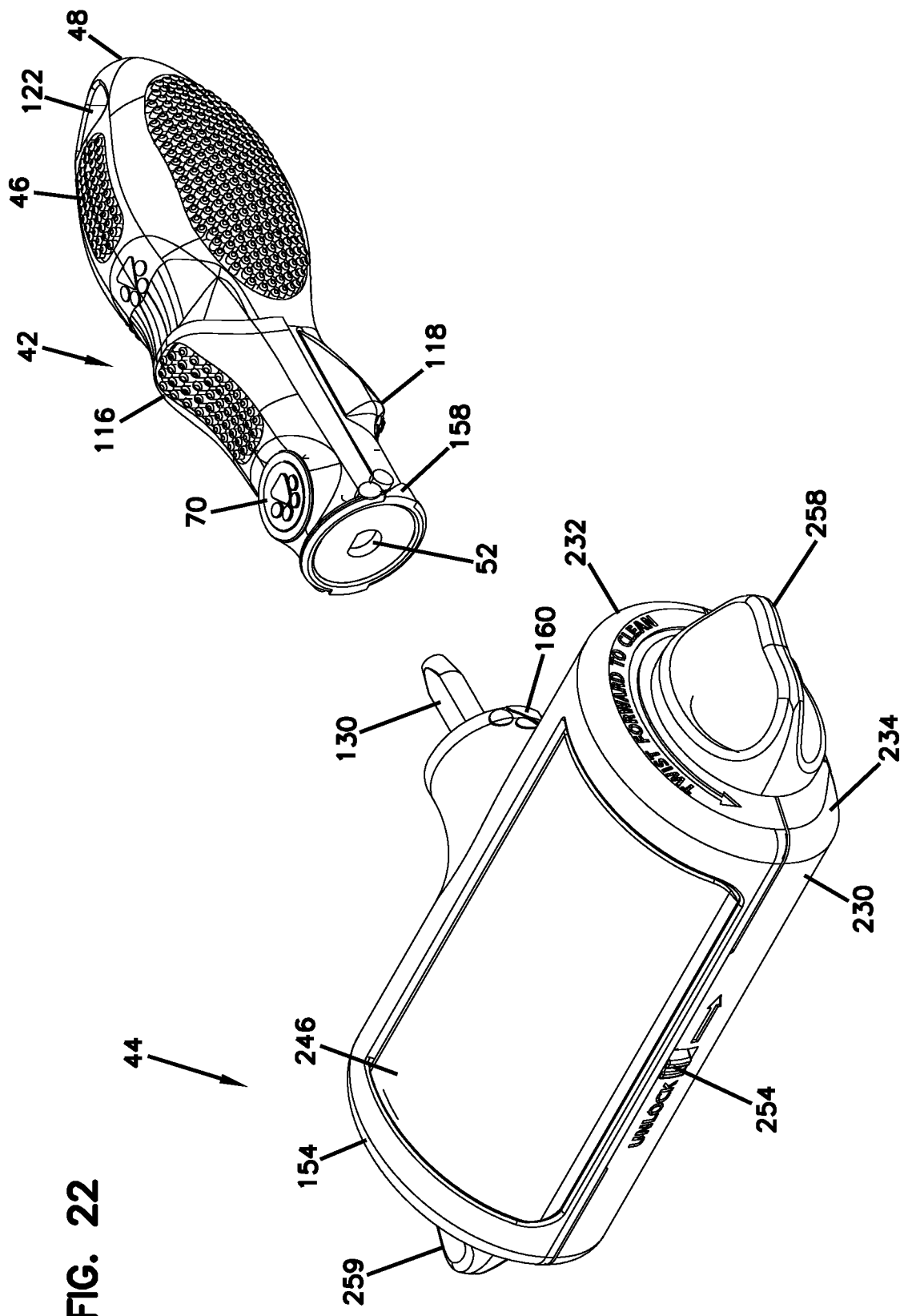
FIG. 22 is an exploded perspective view of the fur sweeper tool and handle of FIGS. 21 and 22.

In FIGS. 21 and 25, it can be seen how the base holder 230 has or defines an opening 242 that provides exposure to the fur attracting material 240 of the roller 238.

Figure 23:
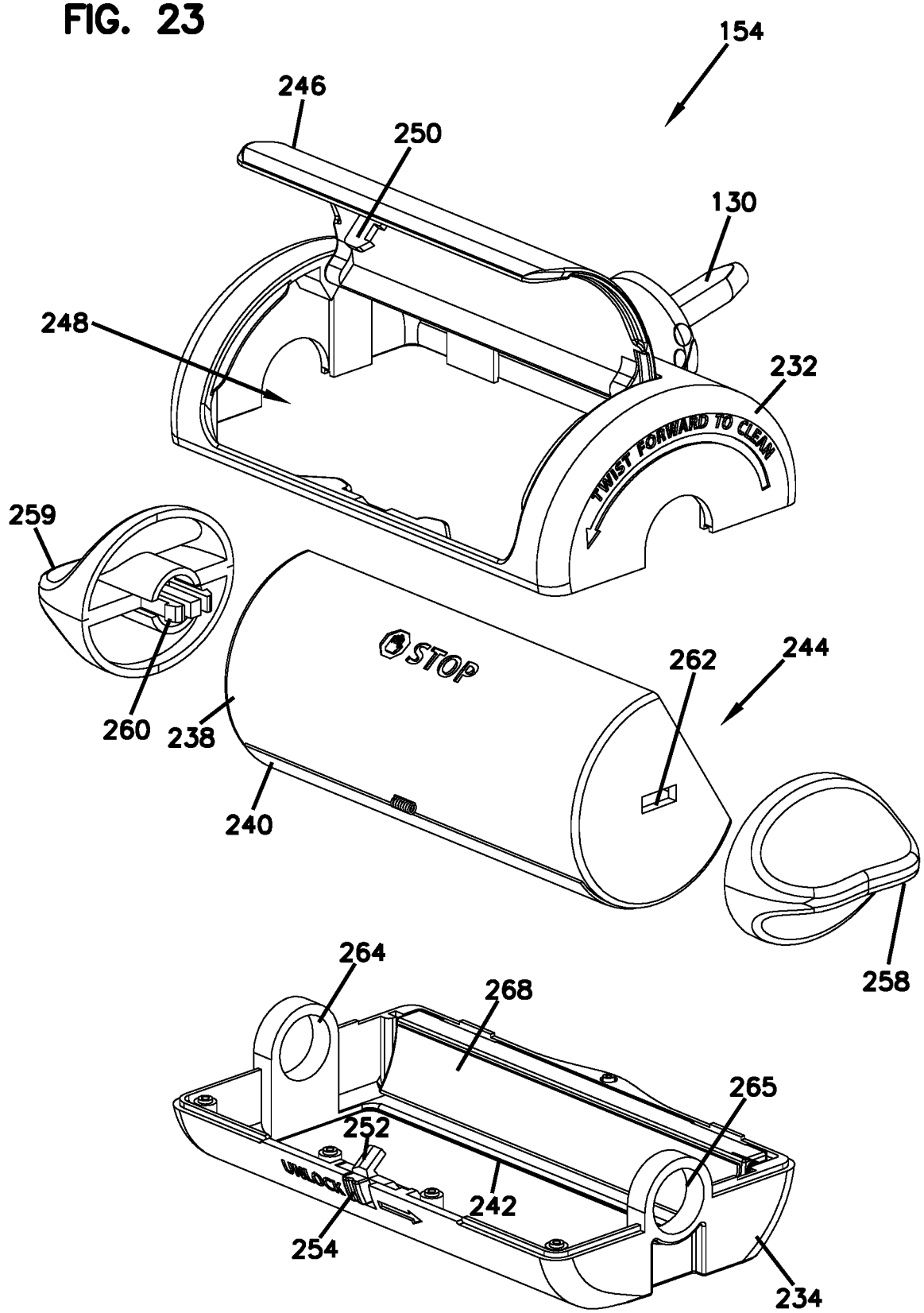
FIG. 23 is an exploded perspective view of the fur sweeper tool depicted in FIGS. 20-22.

The roller 238 defines a chamber 244 (FIG. 25). The chamber 244 collects and stores fur that is picked up by the fur attracting material 240. The chamber 244 is accessible through a movable door 246. The door 246 is pivotally secured to the base holder 230. In FIGS. 23 and 23 it can be appreciated that the door 246 is pivotally mounted to the first half holder 232. When the door 246 is pivoted away from the base holder 230, as shown in FIG. 23, an access opening 248 (FIG. 23) is opened. This will provide access to the chamber 244, when the roller 238 is rolled in a position to provide open communication between the access opening 248 and the chamber 244.

The door 246 is preferably transparent. When transparent, when the roller 238 is rotated so that the chamber 244 is in a position facing the door 246, the user can see how much fur is in the chamber 244.

The door 246 is selectively lockable and unlockable to the base holder 230. Many variations are possible. In the embodiment shown, the door 246 has a hook 250 (FIG. 23) and a slidable pin 252 (FIG. 23) that can be used to engage and disengage the hook 250. In the embodiment shown, the pin 252 is secured to the second half holder 234. A tab 254 is visible from the exterior of the base holder 230, and the user can slide the tab 254 to move the pin 252 out of engagement with the hook 250, which will release the hook 250 and allow the door 246 to open. A spring may be used to have the door 246 pop open when the hook 250 is released.

The roller 238 includes first and second twist knobs 258, 259 at opposite ends of the roller 238 and extending outside of the base holder 230. The twist knobs 258, 259 are secured to the roller 238 such that rotating the twist knobs 258, 259 will rotate the roller 238 within the base holder 230. The knobs 258, 259 can be secured to a remaining portion of the roller 238 in a variety of techniques, including, for example, a snap connection between snap piece 260 (FIG. 23) and a receiver or aperture 262 for the snap piece 260. FIG. 23 shows snap piece 260 as part of the twist knob 259. It should be understood that the knob 258 also has snap piece as depicted at 260. It should also be understood that the aperture 262 is also on the opposite end of the roller 238 for engagement with the snap piece 260 of the knob 259. The twist knobs 258, 259 will pass through holes 264, 265 on the second half holder 234. In between the two holes 264, 265, the roller 238 will be oriented, as can be seen in the exploded view of FIG. 23.

The roller 238 will be rotatable between 70° and 180°.

The base holder 230 will include a mechanism to allow for stripping of some of the fur collected on the fur attracting material 240 to be removed from the roller 238 and deposited in the chamber 244. In the embodiment shown, the base holder 230 will include a section or strip of fur attracting material 268 (FIGS. 23 and 25). The section 268 of fur attracting material is mounted such that when the roller 238 is rotated relative to the base holder 230, the fur attracting material 240 on the roller rubs against the section 268 of fur attracting material on the base holder 230. This will help to strip off or remove at least some of the fur on the roller 238 and push it into the chamber 244. In FIG. 23, the section 268 of fur attracting material is mounted to and held by the second half holder 234 adjacent to the opening 242.

Many different embodiments are possible for the fur attracting material 240, 268. In this embodiment, the fur attracting material 240, 268 is a non-adhesive fabric. The orientation of the material in the fabric is useful in attracting hair or fur. The fabric is preferably a directional fabric made of polyester filament. Many variations are possible. For example, it can include a thickness of about 1.8 mm, a surface resistance of $4.8 \times 10^9$ ohms. The volume resistance can be about $8.7 \times 10^8$ ohms.

In use, the fur sweeper tool 154 can include rubbing the fur attracting material 240 on the roller 238 over a surface to pick up hair or fur from the surface. The method can include rotating the roller 238 to put the fur attracting material 240 of the roller 238 within the access opening 242 in order to ensure exposure of the fur attracting material 240.

The method can further include a step of rotating the roller 238 by rotating one or more of the twist knobs 258, 259 to at least partially clean the hair from the fur attracting material 240 of the roller 238. For example, this step can include moving the section of the roller 238 having the fur attracting material 240 against section 268 of the base holder 230 that also includes fur attracting material, which will remove at least some of the fur from section 240 and push the fur into the chamber 244.

The method can include, after rotating the roller 238, viewing the chamber 244, through the door 246.

The method can include unlocking the door 246 to access the chamber 244, removing hair from the chamber 244, and then locking the door 246 to secure the door 246 to the base holder 230. This can include the step of moving the tab 254, which will move the pin 252 and release the hook 250, allowing the door 246 to pivot open to access opening 248.

The method may further include, after removing hair from the chamber 244, rotating the roller 238 to move or put the fur attracting material 240 of the roller 238 into the opening 242 of the base holder 230.

E. Example Fur Accumulator Tool

The system 40 can include as one of the tools 44 a hair collection tool such as fur accumulator tool 156, depicted in FIGS. 26-30. The fur accumulator tool 156 can be releasably secured to the handle 42, as described above including connection between the post 130 and the handle 142. The post 130 is preferably the post as described in section B above, the description of which is incorporated herein by reference. An example of how the post 130 engages and releasably connects to the handle 42 is the same as shown in connection with FIG. 18, which shows the post 130 connected to mat breaker 150.

In reference now to FIGS. 26-30, the fur accumulator tool 156 includes a base member 280. The handle-engaging post 130 extends from the base member 280. A plurality of nubs 282 extend or project from the base member 280. The nubs 282 can be used to rub against a surface having fur or hair, and it will help to pick up or attract or collect the fur or hair.

The base member 280 has a plate section 284 and a handle engaging section 286. The handle engaging section 286 projects at least partially over the plate section 284. The nubs 282 extend from the plate section 284. The nubs 282 extend in direction away from the direction of the handle engaging section 286. As can be appreciated from reviewing FIGS. 27 and 28, the plate section 284 is between the handle engaging section 286 and the nubs 282. Many embodiments are possible.

In this embodiment, the nubs 282 are held by a substrate 288. The substrate is secured to the plate section 284.

In one example embodiment, the substrate 288 is secured to an intermediate member 290, and the intermediate member 290 is attached to the plate section 284 through conventional manners, such as ultrasonic welding, or adhesive attachment. The substrate 288 can be secured to the intermediate member 290 such as by injection molding. In the example shown in FIG. 30, the member 290 includes holes 292, in which injected molded polymer can be deposited therethrough into a mold to make the substrate 288. Connection members 294 on the substrate 288 can be used as a way of securing the substrate 288 to the member 290. On the opposite side of the substrate 288 from the side shown in FIG. 230 are the nubs 292. The nubs 292 can be made by a molding process with the substrate 288.

The nubs 282 will be sized to be used with, for example, short carpet, upholstery, or clothing to remove hair or fur. Many embodiments can be made. In this example, the nubs 282 have a height of less than ⅜ inch. The nubs 282 may have a height of greater than ⅛ inch.

There can be a total of at least 150 nubs 282. In one or more embodiments, there can be fewer than a total of 300 nubs 282. In many useful embodiments, there will be about 20-30 nubs 282 per square inch.

The plate section 284 holding the nubs 282 will generally be flat and planar. The plate section 284 will be sized in many different dimensions. For example, the plate section 284 can have a width of at least 3 inches and a length of at least 4 inches. The plate section 284 can have a width of not greater than 6 inches, and a length of not greater than 8 inches.

Figure 26:
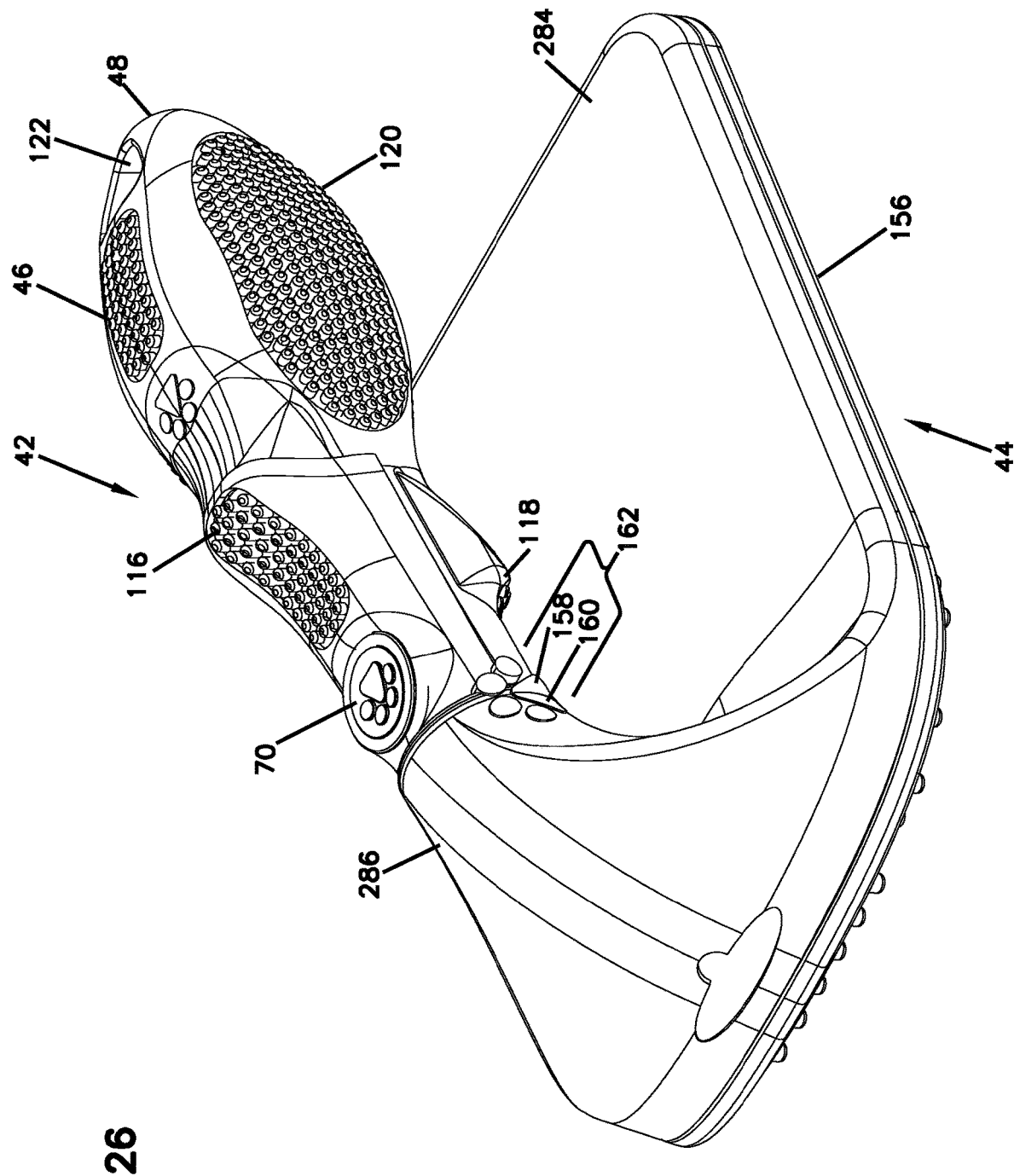
FIG. 26 is a perspective view of a fur accumulator tool and handle, constructed in accordance with principles of this disclosure.
Figure 27:
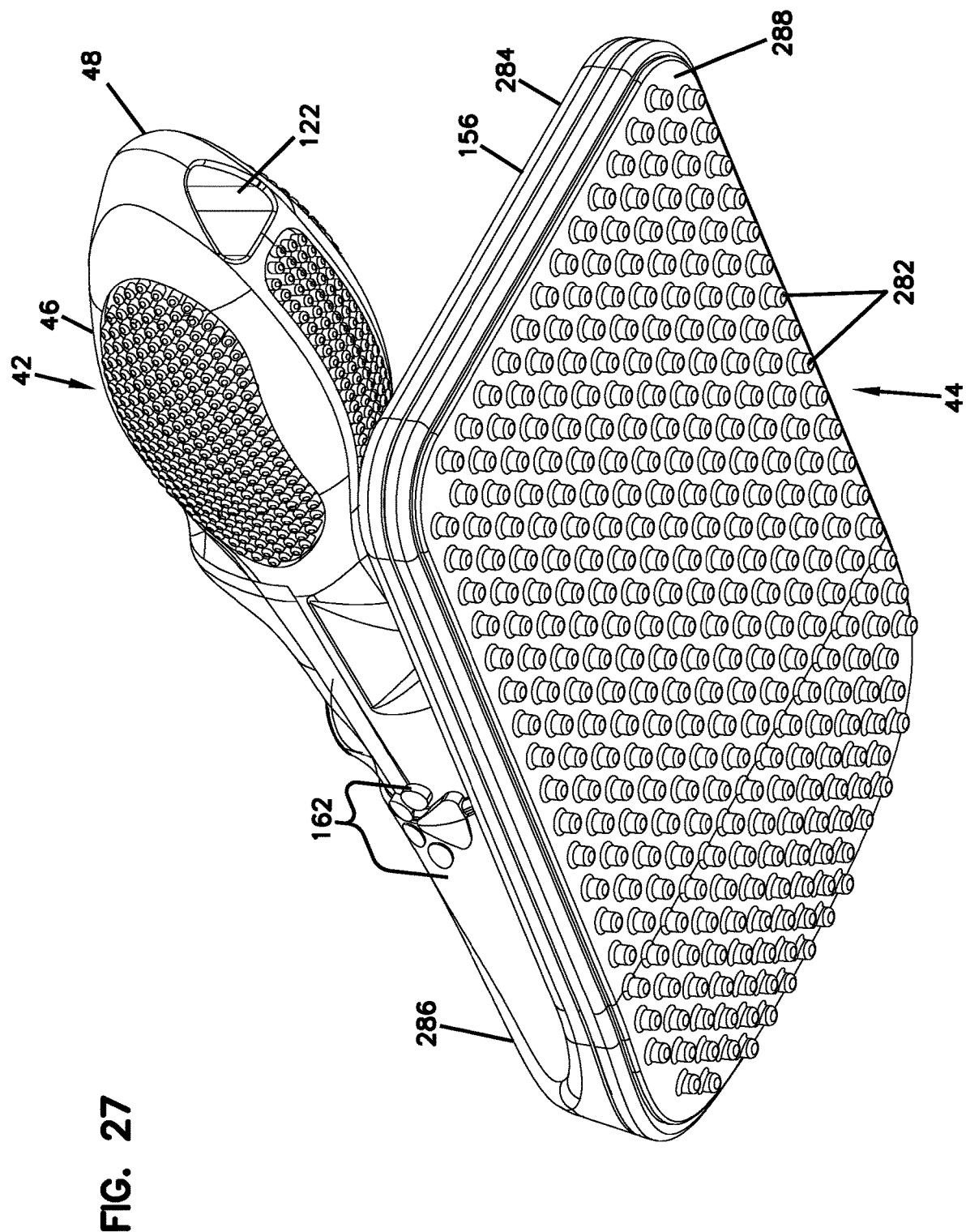
FIG. 27 is another perspective view of the fur accumulator tool and handle of FIG. 26.
Figure 28:
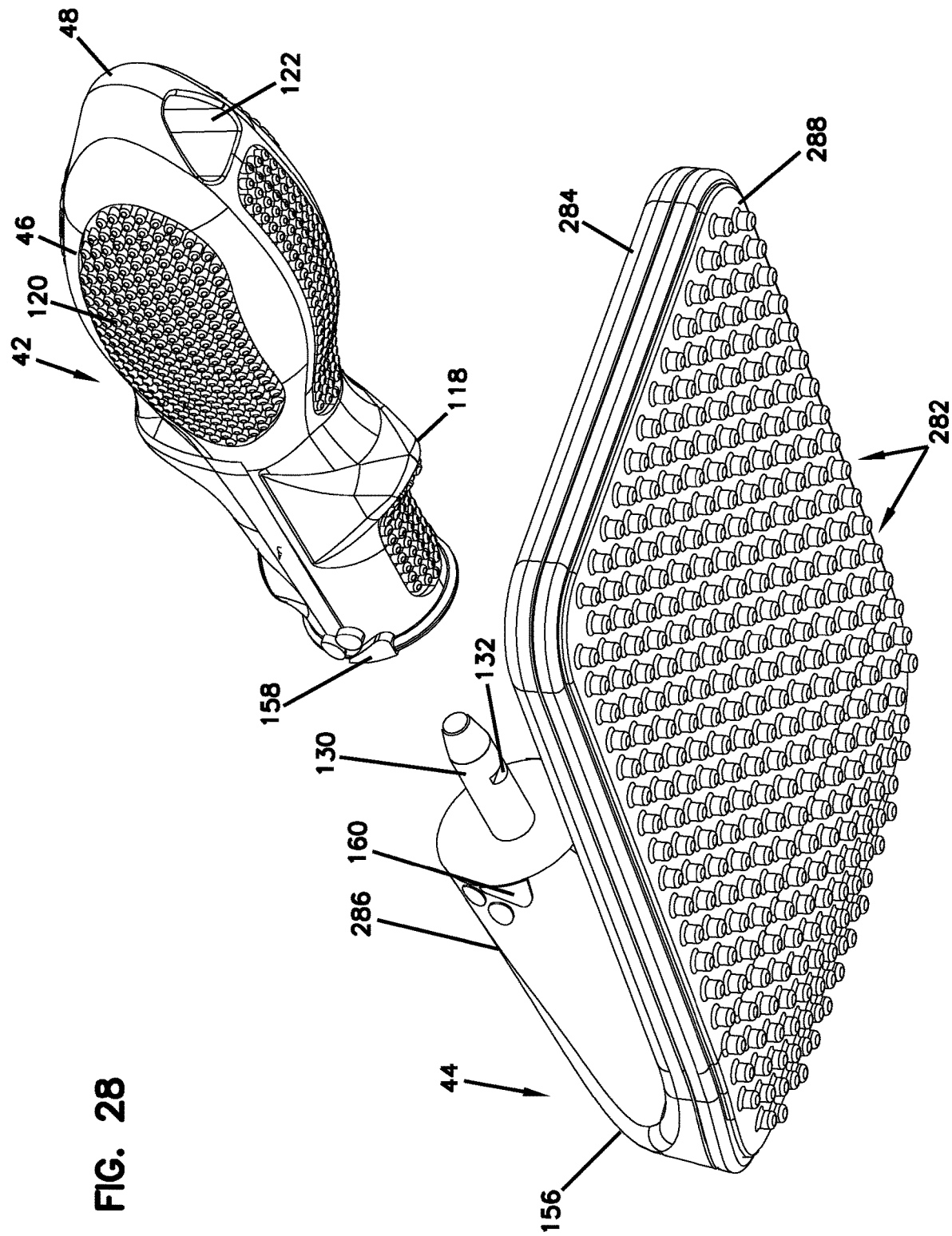
FIG. 28 is an exploded perspective view of the fur accumulator tool and handle of FIGS. 26 and 27.
Figure 29:
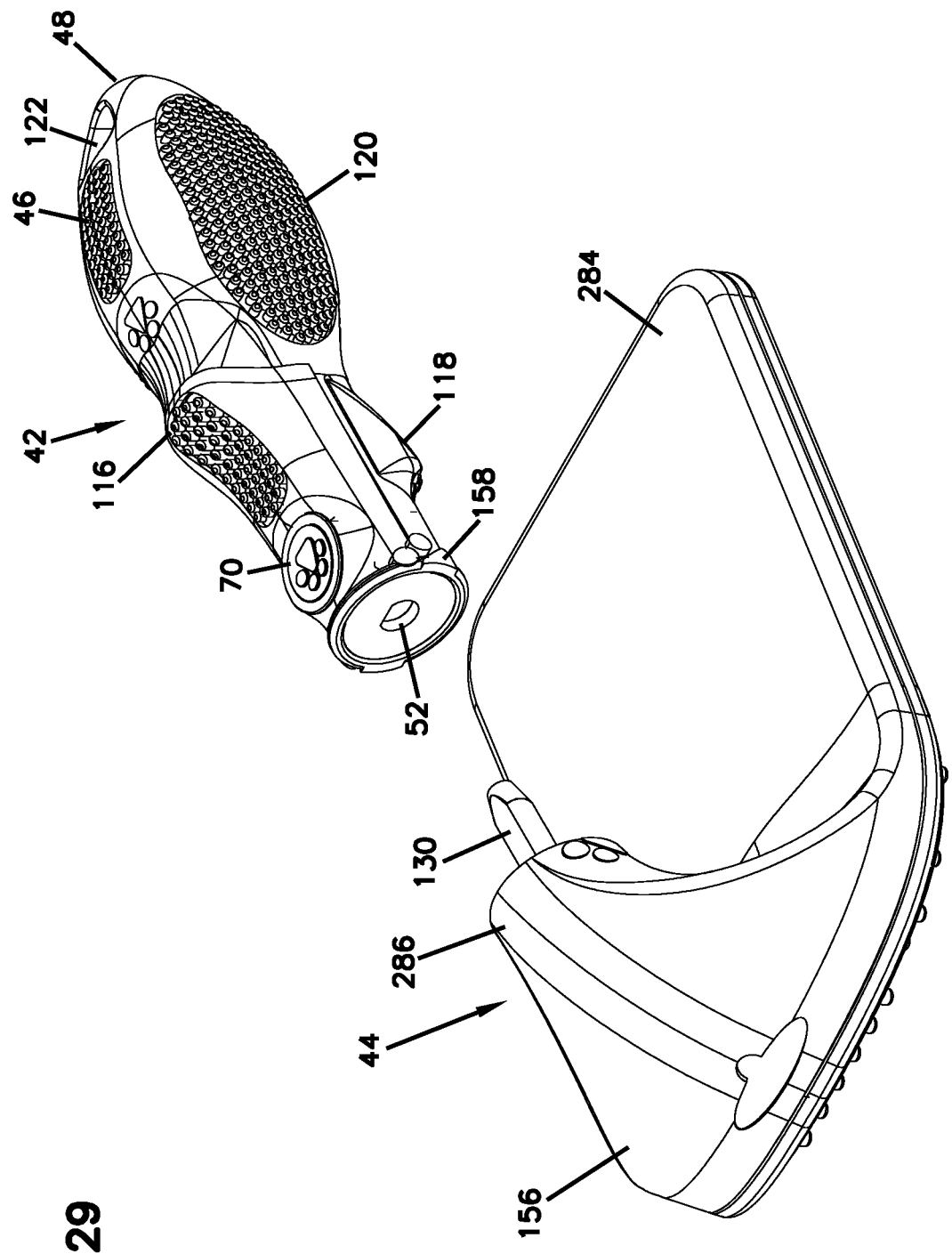
FIG. 29 is another exploded, perspective view of the fur accumulator tool and handle of FIGS. 26 and 27.
Figure 30:
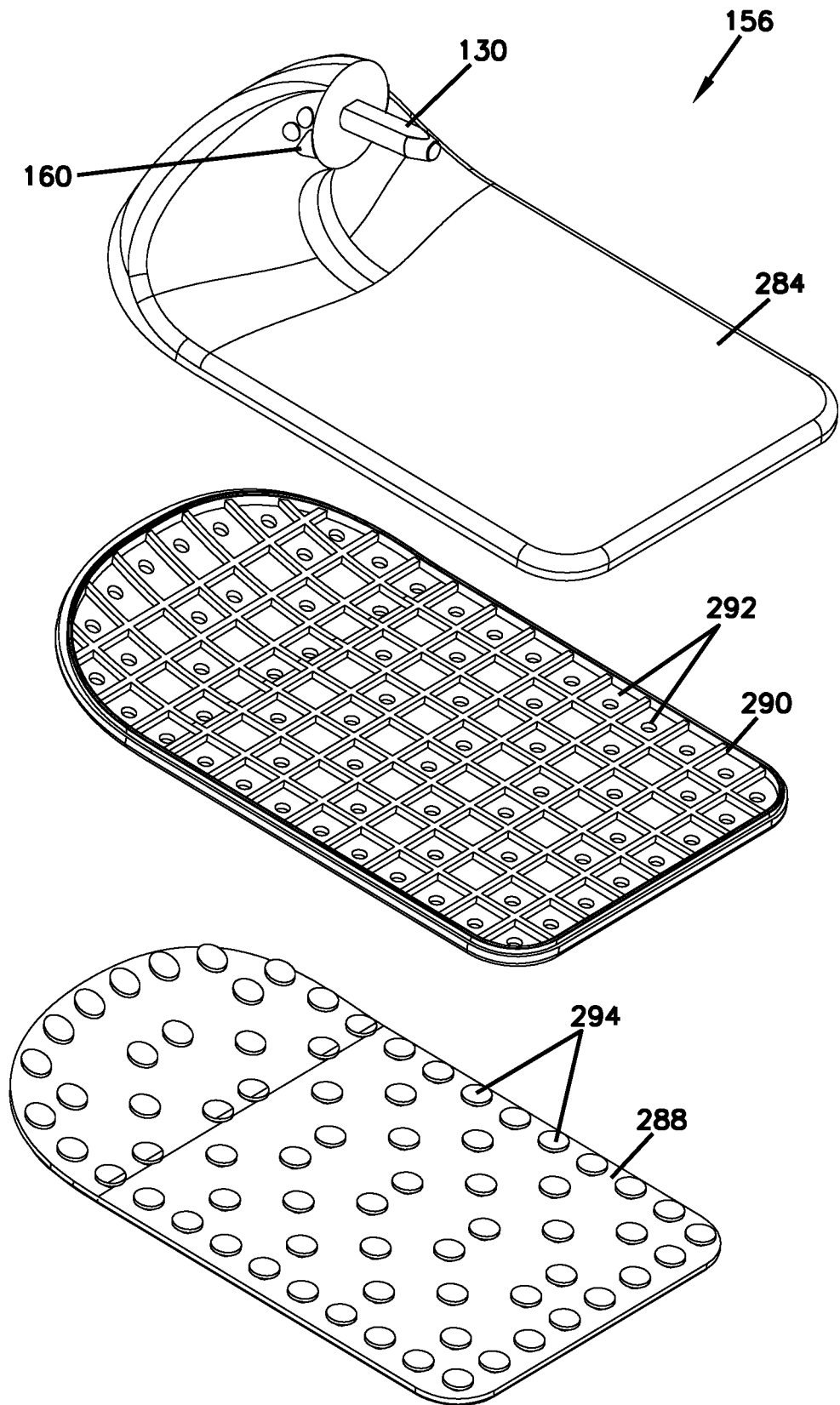
FIG. 30 is an exploded perspective view of the fur accumulator tool of FIGS. 26-29.

As can be seen in FIGS. 26-28, in use, the handle 42 will extend and project over the majority of, and in some cases, the totality of the plate section 284. This provides comfortable and convenient use by the user.

A method of using the fur accumulator 156 includes moving the nubs 282 against and over a hairy surface to pick up the hair by the nubs 282 from the surface.

The nubs 282 and substrate 288 can be made from a molded plastic material.

The above represents principles of this disclosure. Many embodiments can be made using these principles.

What is claimed is:

1. A system for grooming an animal comprising:
   (a) a handle including a grip sized to be grasped by a human hand; the grip including a tool-receiving bore defined therein and a lock mechanism to secure a tool within the bore and to selectively release the tool from the bore; and
   (b) a collection of animal grooming tools including each of a de-shedding tool, a brush, a mat breaker, a fur sweeper tool, a fur accumulator tool, and a comb, wherein each of the tools in the collection of tools is configured to be releasably secured within the bore with the lock mechanism.

2. The system of claim 1 wherein the tool includes a post sized to fit within the bore.

3. The system of claim 2 wherein the post includes a detent sized and shaped to receive a pin of the lock mechanism.

4. The system of claim 3 wherein the post has a free end and an opposite tool end, and the detent is spaced less than 0.5 inches from the free end and spaced more than 0.25 inches from the free end.

5. The system of claim 3 wherein the post is shaped to be received within the bore for engagement with the pin in only a single orientation.

6. The system of claim 5 wherein one side of the post has a flat surface.

7. The system of claim 6 wherein the side of the post having the detent is opposite of the side of the post having the flat surface.

8. The system of claim 1 wherein the mat breaker includes
   (a) a base member;
   (b) a handle-engaging post extending from the base member; and
   (c) a set of curved teeth held in the base member, the set of teeth being movable within the base member.

9. The system of claim 8 wherein the set of teeth are movable to point a first direction or 180° opposite of the first direction in a second direction.

10. The system of claim 1 wherein the fur sweeper tool includes:
    (a) a base holder;
    (b) a handle-engaging post extending from the base holder; and
    (c) roller held by the base holder having fur attracting material, the roller being pivotable relative to the base holder.

11. The system of claim 10 wherein:
    (a) the base holder includes an open tube;
    (b) the roller is rotatably held within the open tube; and
    (c) the base holder has an opening providing exposure to the fur attracting material of the roller.

12. The system of claim 1 wherein the fur accumulator tool includes:
    (a) a base member;
    (b) a handle-engaging post extending from the base member; and
    (c) a plurality of nubs extending from the base member, the nubs having a height less than ⅜ inch.

13. The system of claim 12 wherein the base member has a plate section and a handle engaging section projecting over the plate section, the nubs extending from the plate section, the base member having 20-30 nubs per square inch.

14. The system of claim 1 wherein:
    (a) the grip having a free end and an opposite tool-receiving end; the grip having a cavity with the tool-receiving bore at the tool-receiving end; and an aperture with a center axis orthogonal to a center axis of the tool-receiving bore;
    (b) a shaft insert positioned within the cavity of the grip;

(c) a component holder held by the shaft insert; the component holder including,
   (i) a spring seat; and
   (ii) slots along opposite sides;
(d) a push button saddle having a pair arms slidably positioned in the slots of the component holder;
(e) a pin held by the arms in the saddle; the pin being movable by the saddle radially into and out of the tool-receiving bore;
a spring positioned in the spring seat of the component holder and between the between the component holder and saddle; and
(g) a push button extending through the aperture in the grip and abutting the saddle.

15. A method of using a system for grooming including:
(a) providing a handle and providing a collection of animal grooming tools including each of a de-shedding tool, a brush, a mat breaker, a fur sweeper tool, a fur accumulator tool, and a comb;
(b) selecting one of the tools from the collection of tools; and
(c) releasably securing the selected tool to the handle.

16. The method of claim 15 wherein the step of providing a handle includes the handle comprising:

(a) a grip sized to be grasped by a human hand; the grip having a free end and an opposite tool-receiving end; the grip having a cavity with an opening at the tool-receiving end; and an aperture with a center axis orthogonal to a center axis of the opening in the cavity;
(b) a shaft insert positioned within the cavity of the grip;
(c) a component holder held by the shaft insert; the component holder including,
   (i) an open volume defining a tool-receiving bore; the tool-receiving bore being at the tool-receiving end of the grip;
   (ii) a spring seat; and
   (iii) slots along opposite sides;
(d) a push button saddle having a pair arms slidably positioned in the slots of the component holder;
(e) a pin held by the arms in the saddle; the pin being movable by the saddle;
(f) a spring positioned in the spring seat of the component holder and between the component holder and saddle; and
(g) a push button extending through the aperture in the grip and abutting the saddle.

* * * * *